US011921706B2

(12) United States Patent
Bartolucci et al.

(10) Patent No.: US 11,921,706 B2
(45) Date of Patent: Mar. 5, 2024

(54) METHODS AND SYSTEMS FOR CONTROLLING ACCESS TO, AND INTEGRITY OF, RESOURCES ON A BLOCKCHAIN

(71) Applicant: nChain Licensing AG, Zug (CH)

(72) Inventors: Silvia Bartolucci, London (GB); Pauline Bernat, London (GB); Daniel Joseph, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/592,394

(22) Filed: Feb. 3, 2022

(65) Prior Publication Data

US 2022/0335036 A1 Oct. 20, 2022

Related U.S. Application Data

(63) Continuation of application No. 16/979,349, filed as application No. PCT/IB2019/051765 on Mar. 5, 2019, now Pat. No. 11,243,943.

(30) Foreign Application Priority Data

Mar. 9, 2018 (GB) ...................................... 1803815

(51) Int. Cl.
*H04L 29/06* (2006.01)
*G06F 16/23* (2019.01)
(Continued)

(52) U.S. Cl.
CPC ........ *G06F 16/2379* (2019.01); *H04L 9/0637* (2013.01); *H04L 9/085* (2013.01);
(Continued)

(58) Field of Classification Search
None
See application file for complete search history.

(56) References Cited

U.S. PATENT DOCUMENTS 7,167,559 B2 *  1/2007  Ono ......................... G06F 7/723
                                                     713/174
7,987,368 B2 *  7/2011  Zhu ....................... H04L 67/104
                                                     713/176
(Continued)

FOREIGN PATENT DOCUMENTS

CN       107679976 A     2/2018
EP         2285040 A1    2/2011
(Continued)

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Maung T Lwin
(74) *Attorney, Agent, or Firm* — Davis Wright Tremaine LLP

(57) ABSTRACT

A method and devices for verifying a digital resource by a plurality of node devices in a blockchain network. The plurality of nodes have respective private key shares, where a collective private key of a collective private-public key pair is based on a set of the respective private key shares, and where each node has a nodal private-public key pair. The digital resource may be encrypted using a digital resource crypto public key, the digital resource crypto public key including combination of a nodal public key and a collective public key. The digital resource may be submitted to a repository system by broadcasting a commitment transaction and a subsequent reveal or rescind transaction of a commitment channel, the commitment channel formed between a respective node and a principal node. Decrypting the encrypted digital resource is based on retrieving private key share contributions from the plurality of nodes participating in verifying the digital resource.

19 Claims, 11 Drawing Sheets

(51) Int. Cl.
| | |
|---|---|
| *H04L 9/06* | (2006.01) |
| *H04L 9/08* | (2006.01) |
| *H04L 9/30* | (2006.01) |
| *H04L 9/32* | (2006.01) |
| *H04L 9/40* | (2022.01) |
| H04L 9/00 | (2022.01) |

(52) U.S. Cl.
CPC .......... *H04L 9/3073* (2013.01); *H04L 9/3255* (2013.01); *H04L 63/102* (2013.01); *H04L 9/50* (2022.05)

(56) References Cited

U.S. PATENT DOCUMENTS

| | | | | |
|---|---|---|---|---|
| 8,069,470 | B1* | 11/2011 | Montenegro | H04L 9/3226 726/6 |
| 8,316,237 | B1* | 11/2012 | Felsher | H04L 9/3249 380/282 |
| 8,483,386 | B2* | 7/2013 | Obana | H04L 9/085 705/75 |
| 8,868,467 | B2* | 10/2014 | Serebrennikov | G06Q 20/34 705/75 |
| 9,858,569 | B2 | 1/2018 | Phan et al. | |
| 2006/0083369 | A1* | 4/2006 | Lee | H04L 9/085 380/28 |
| 2011/0099362 | A1* | 4/2011 | Haga | H04L 9/0897 380/284 |
| 2014/0289528 | A1* | 9/2014 | Baghdasaryan | H04L 9/3297 713/171 |
| 2016/0149908 | A1* | 5/2016 | Unagami | H04L 63/065 713/170 |
| 2016/0191243 | A1 | 6/2016 | Manning | |
| 2017/0075938 | A1 | 3/2017 | Black et al. | |
| 2017/0116693 | A1 | 4/2017 | Rae et al. | |
| 2017/0126684 | A1 | 5/2017 | Armknecht et al. | |
| 2017/0154331 | A1 | 6/2017 | Voorhees | |
| 2017/0243193 | A1 | 8/2017 | Manian et al. | |
| 2017/0279783 | A1 | 9/2017 | Milazzo et al. | |
| 2017/0324711 | A1 | 11/2017 | Feeney et al. | |
| 2018/0054316 | A1 | 2/2018 | Tomlinson et al. | |
| 2018/0158036 | A1* | 6/2018 | Zhou | G06F 1/163 |
| 2018/0359096 | A1 | 12/2018 | Ford et al. | |
| 2019/0222414 | A1* | 7/2019 | Pe'er | H04L 9/088 |

FOREIGN PATENT DOCUMENTS

| | | |
|---|---|---|
| GB | 2540977 A | 2/2017 |
| WO | 2008127446 A2 | 10/2008 |
| WO | 2017136643 A1 | 8/2017 |
| WO | 2018100227 A1 | 6/2018 |

OTHER PUBLICATIONS

Fu, Meta-Key: A Secure Data-Sharing Protocol under Blockchain-Based Decentralised Storage Architecture, ArXiv, Oct. 22, 2017, https://arxiv.org/pdf/1710.07898.pdf, 5 pages.
International Search Report and Written Opinion dated May 20, 2019, Patent Application No. PCT/IB2019/051765, 18 pages.
Kokoris-Kogias et al., "CALYPSO: Private Data Management for Decentralized Ledgers," Cryptology ePrint Archive, Report 2018/209, Feb. 21, 2018, https://eprint.iacr.org/2018/209, 17 pages.
Kokoris-Kogias et al., "Hidden in Plain Sight: Storing and Managing Secrets on a Public Ledger," Cryptology ePrint Archive: Report 2018/209, Feb. 21, 2018, https://eprint.iacr.org/eprint-bin/getfile.pl?entry=2018/209&version=20180222:161528&file=209.pdf, 20 pages.
Lee, "Patch Transporter: Incentivized, Decentralized Software Patch System for WSN and IoT Environments," Sensors 18(2):574, Feb. 13, 2018, http://www.mdpi.com/1424-8220/18/2/574/pdf, 35 pages.
Microsoft, "The Coco Framework Technical Overview," Microsoft Corporation, Aug. 10, 2017, https://de.slideshare.net/WillyDevNET/coco-framework-whitepaper, 28 pages.
Nakamoto, "Bitcoin: A Peer-to-Peer Electronic Cash System," Bitcoin, Oct. 31, 2008, https://bitcoin.org/bitcoin.pdf, 9 pages.
Ouaddah et al., "FairAccess: a new Blockchain based access control framework for the Internet of Things," Security and Communication Networks 9(18):5943-5964, Feb. 2017, https://www.researchgate.net/publication/313847688_FairAccess.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Satoshi et al., "Connection Limits," Bitcoin Forum, Aug. 9, 2010, https://bitcointalk.org/index.php?topic=741.0; brev_next=prev, 2 pages.
Schoenmakers, "A simple publicly verifiable secret sharing scheme and its application to electronic voting," Annual International Cryptology Conference, Aug. 15, 1999, 17 pages.
Schär et al., "Unclaimed Parcel Auctioning," Github, Jan. 26, 2018, https://github.com/decentraland/proposals/blob/master/dsp/dsd-chainomics-unclaimedparcels.mediawiki, 3 pages.
Shamir, "How to share a secret" Communications of the ACM 22(11):612-3, Nov. 1, 1979.
Stadler, "Publicly verifiable secret sharing," International Conference on the Theory and Applications of Cryptographic Techniques, May 12, 1996, https://link.springer.com/content/pdf/10.1007/3-540-68339-9_17.pdf, 10 pages.
Storj Labs, Inc., Storj: A Decentralized Cloud Storage Network, https://github.com/storj/whitepaper, V3.0, Oct. 30, 2018, 90 pages.
Tian et al., "A Simpler Bitcoin Voting Protocol," International Conference on Information Security and Cryptology, Nov. 3, 2017, 18 pages.
Tlr et al., "Time-release encryption using Bitcoin?," Bitcoin Forum, Jul. 2013, https://bitcointalk.org/index.php?topic=248466.0;imode, 2 pages.
UK Commercial Search Report dated Jul. 31, 2018, Patent Application No. GB1803815.8, 10 pages.
UK IPO Search Report dated Sep. 3, 2018, Patent Application No. GB1803815.8, 3 pages.
Wikipedia, "Fiat-Shamir heuristic," Wikipedia the Free Encyclopedia, most recent edit Sep. 21, 2021, https://en.wikipedia.org/wiki/Fiat%E2%80%93Shamir_heuristic, 3 pages.
Wilkinson et al., "Storj—A Peer-to-Peer Cloud Storage Network v2.0," Dec. 15, 2016, https://storj.io/storj.pdf, 37 pages.
Kokoris-Kogias et al., "Calypso: Auditable Sharing of Private Data Over Blockchains," Aug. 6, 2018, 17 pages.

\* cited by examiner

METHODS AND SYSTEMS FOR CONTROLLING ACCESS TO, AND INTEGRITY OF, RESOURCES ON A BLOCKCHAIN

CROSS REFERENCE TO RELATED APPLICATIONS

This application is a continuation of U.S. patent application Ser. No. 16/979,349, filed Sep. 9, 2020, which is a 371 National Stage of International Patent Application No. PCT/IB2019/051765, filed Mar. 5, 2019, which claims priority to United Kingdom Patent Application No. 1803815.8, filed Mar. 9, 2018, the disclosures of which are incorporated herein by reference in their entirety.

The present application relates generally to secure access to, and control of, digital resources, assets and/or data. In can also relate to preserving and enforcing the state of such digital entities, and also to how these can be distributed or shared among computer-based resources. More particularly, the present application relates to the verification of a digital resource/asset/data by a plurality of nodes in a blockchain network.

In this document, the term 'blockchain' is used to include all forms of electronic, computer-based, distributed ledgers. These include consensus-based blockchain and transaction-chain technologies, permissioned and un-permissioned ledgers, shared ledgers, and variations thereof. A widely known application of blockchain technology is the Bitcoin ledger, although other blockchain implementations have been proposed and developed. While Bitcoin may, in some examples, be referred to herein for the purpose of convenience and illustration only, it should be noted that the present application is not limited to use with the Bitcoin blockchain. Alternative blockchain implementations and protocols fall within the scope of the present application. The term "Bitcoin" is used herein to include all variations and versions deriving from or based upon the Bitcoin protocol. The abbreviation "BTC" may be used for convenience of reference only.

A blockchain is a peer-to-peer, electronic ledger which is implemented as a computer-based decentralized system made up of blocks which in turn are made up of transactions. Each transaction is a data structure that encodes the transfer of control of a digital asset between addresses in the blockchain system, and includes at least one transaction input and at least one transaction output. Each block contains a hash of the previous block so that blocks become chained together to create a permanent, unalterable record of all transactions which have been written to the blockchain since its inception.

The concept of decentralization is fundamental to the blockchain system. Decentralized systems provide the advantage that, unlike distributed or centralized systems, there is no single point of failure. Therefore, decentralized systems offer an enhanced level of security and resilience. The security is further enhanced by the use of known cryptographic techniques such as Elliptic Curve Cryptography and ECDSA.

Ownership and control over a digital asset or resource in a blockchain system is controlled through public-private key pairs. The digital asset or resource can be a token. The token can be representative of any type of entity. This could include currency, hard assets, soft assets, computing resources, or any other entity or service. For ease of reference, we may use the term "asset". An unspent transaction output (UXTO) address is akin to a public key, and control over the asset allocated to that UXTO address is evinced by use of the corresponding private key. To transfer the digital asset by using the UXTO as an input to another transaction, the input must be digitally signed by the corresponding private key. Accordingly, control over the security and secrecy of private keys is fundamental to the security and reliability of the blockchain.

One type of digital asset can include, for example, electronic documents. However, the invention is not limited to use in respect of documents, and access control, security and/or integrity preservation of other types of digital resource also fall within the scope of the invention. For example, software is often distributed over computing networks. The distribution, storage and handling of that software needs to be performed in a secure manner, wherein access is controlled and unauthorised access or alteration is prevented. The state and integrity of the software needs to be ensured, and verifiable as unaltered. However for convenience only, we may refer to electronic documents as a convenient illustration.

In some situations, multiple nodes may submit documents in a situation in which the substance of the documents is to remain confidential until all documents are revealed, and in which post-submission alterations to the documents is prevented. Thus, access to the data must be appropriately controlled, as well as processing or manipulation of that data. Paper-based submission processes would have relied on enclosing the documents in a sealed envelope and opening the envelopes after submissions are received from all participants. All such systems are now implemented using computer networks and documents are provided in electronic form, making the sealing of such documents and preventing their alteration very difficult. There is a significant risk that a submitted electronic document may be revealed or accessed improperly and the integrity of the document or the submission process may be impugned. The processes require trust in the manager or principal that oversees and implements the submission system, and trust in the technical security of the computer system for receiving and storing the documents. This is not ideal, as security breaches and unauthorised access of data, and possibly its alteration as well, are numerous and well known.

For example only, and without limitation of the invention, an electronic document may be submitted as part of a tender procurement process in a competitive bidding situation. To preserve the integrity of the process, it is fundamental that no bidder is able to access another bidder's material prior to the end of the submission period and that no bid is altered after submission. Accordingly, bidders need to rely on the honesty and integrity of the party seeking the bids, and the security of any computing system used for bid submission and storage.

In another purely illustrative example, documents may be submitted as part of a real estate purchase process, such as an offer and acceptance process involving multiple offeree parties. Existing real estate offer and acceptance processes typically rely on a real estate broker to maintain integrity and security of the offer and acceptance process, ensuring that respective offerees are not privy to details of another offeree's offer. Offers may be received via facsimile or via electronic mail; however, existing devices and systems rely on the integrity of a real estate broker for maintaining the security of the offer documents and for revealing the offer documents only after all offerees have provided an offer document.

In another example, documents may be submitted as part of a testing process, like the submission of examination papers or essays for marking. The contents of the papers should not be made available to anyone until all papers are submitted to prevent copying; and no alteration of submitted papers should be possible.

Other example situations may also be enabled through providing for a method and system that ensures submitted documents remain secured and confidential until all submissions are received, and wherein each document is verifiably unaltered. It would be advantageous to provide for methods and system that ensure submitted electronic documents are secure, inaccessible to any until all document are accessible, and unaltered.

Thus, there is a need for improved solutions relating to data and digital resources for which access and storage need to be controlled in a secure manner, and wherein alteration of the state of the data/resource prevented and/or the integrity of that state can be verified.

The present application provides methods and systems having such advantages, amongst others.

The present application provides method(s) and system(s) as defined in the appended claims.

In overview, the present application may provide computer-implemented methods and systems for controlling access to a digital asset or resource, maintaining the state of that asset or resource, and/or verifying that the state has not been altered.

Methods and systems of the invention may provide that participating nodes hold private key shares and collaborate in creating a public key. A digital resource or asset to be submitted by one of the participating nodes is encrypted using the node's own public key and the collaboratively-obtained public key, thereby meaning that the node's own private key and a collaborative private key are required to decrypt the digital asset or resource. (It is important to note that hereafter the digital asset/resource/data may be referred to as simply an "asset", "digital resource" or even a "document" purely for convenience, but that the invention is not thus limited).

Through forming commitment channels between each participating node and a principal node, the participating nodes may confirm submission of their respective encrypted document to a public storage. Each participating node may eventually submit a transaction on the blockchain that reveals its private key share such that any of the nodes is able to then create the collaborative private key from the shares extracted from the blockchain. If the participating node intends its own document to be revealed (since it may opt to withdraw), then it may also disclose its own private key, thereby enabling decryption of its document. The blockchain transactions may further include hashes of the submitted documents so as to enable verification of the integrity of the documents. "Verifying the integrity" may comprise verifying or proving that the state of the digital resource has not been altered. In this manner, the nodes may be assured that their document is only revealed when all other nodes have participated in revealing their respective key shares on the blockchain and all documents from participating nodes become decryptable and accessible at the same time. The present system may thus provide for coordinated and synchronized access to the encrypted documents in a manner in which the documents are verifiably unaltered.

The present invention may provide a computer-implemented method of controlling access to, and/or verifying, a digital resource (e.g. document, software etc.) by a plurality of nodes and a principal node in a blockchain network.

The plurality of nodes may have respective private key shares, where a collective private key of a collective private-public key pair is based on a set of the respective private key shares, and where a first node has a first nodal private-public key pair. The method may be performed by a node. It may include: generating, by the first node, a document crypto public key by combining a first nodal public key of the first nodal private-public key pair and a collective public key of the collective private-public key pair; encrypting the document using the document crypto public key; generating one or more blockchain transactions for a first commitment channel by: generating, by the first node, a commitment transaction having a commitment transaction output locked by a private key share of the first node such that a valid subsequent transaction having the commitment transaction output as an input is (required) to include the private key share of the first node, and receiving, by the first node, the valid subsequent transaction signed by the principal node. The method may also include the step of: in response to receiving the valid subsequent transaction signed by the principal node, broadcasting the commitment transaction to the blockchain network.

In some implementations, the method includes broadcasting, by the first node, to the blockchain network the valid subsequent transaction that is signed by the principal node prior to a first time-lock threshold to reveal the private key share of the first node on the blockchain.

In some implementations, the method includes retrieving from the blockchain the set of private key shares associated with the document; in response to determining that a quantity of private key shares is greater than a private key share threshold, regenerating the collective private key of the collective private-public key pair from the retrieved set of private key shares; and decrypting the encrypted document using a document crypto private key, the document crypto private key being a combination of the regenerated collective private key and a first nodal private key of the first nodal private-public key pair.

In some implementations, the commitment transaction has a transaction output that includes more than one unlocking options including a reveal option that requires a hash of the document, the private key share of the first node, a first nodal private key of the first nodal private-public key pair, a signature of the principal node, and a signature of the first node, such that a valid subsequent transaction includes a transaction input with said hash of the document, said private key share of the first node, said first nodal private key of the first nodal private-public key pair, said signature of the principal node, and said signature of the first node for selecting the reveal option.

In some implementations, the commitment transaction has a transaction output (UTXO) that includes more than one unlocking options including a rescind option that requires the private key share of the first node, a signature of the principal node, and a signature of the first node, such that a valid subsequent transaction includes a transaction input with said private key share of first node, said signature of the principal node, and said signature of the first node for selecting the rescind option.

In some implementations, the commitment transaction has a transaction output that includes more than one unlocking options including a timeout option that requires a signature of the principal node and a signature of the first node, such that a valid subsequent transaction includes a transaction input with said signature of the principal node and said signature of the first node for selecting the timeout option.

In some implementations, the encrypted document is stored in a public repository, and wherein the commitment transaction broadcasts to the blockchain network that a document generated by the first node is saved at the public repository.

In some implementations, an encumbrance on a first asset value is removed in response to the transaction input of the valid subsequent transaction having at least a signature of the principal node and a signature of the first node.

In some implementations, the valid subsequent transaction is a rescind transaction signed by the principal node, and wherein prior to receiving the rescind transaction signed by the principal node, and the method includes: generating the rescind transaction including a transaction input having the private key share of the first node and a signature of the first node.

In some implementations, an encumbrance on a first asset value is removed in response to the transaction input of the rescind transaction having the private key share of the first node, a signature of the principal node, and the signature of the first node, and an encumbrance on a second asset value is removed in response to a transaction input of a further transaction having the signature of the principal node, and wherein an encumbrance on a third asset value is removed in response to a transaction input of a further transaction having the signature of the first node, and the third asset value is a difference between the first asset value and the second asset value.

In some implementations, the valid subsequent transaction is a reveal transaction signed by the principal node, and prior to receiving the reveal transaction signed by the principal node, the method includes: generating the reveal transaction to include a transaction input having a hash of the document, a private key share of the first node, a first nodal private key of the first nodal private-public key pair, and a signature of the first node.

In some implementations, an encumbrance on a first asset value is removed in response to the transaction input of the reveal transaction having the hash of the document, the private key share of the first node, the first nodal private key of the first nodal private-public key pair, a signature of the principal node, and the signature of the first node, and an encumbrance on a fourth asset value is removed in response to a transaction input of a further transaction having the signature of the principal node, and wherein an encumbrance on a fifth value is removed in response to a transaction input of a further transaction having the signature of the first node, and the fifth asset value is a difference between the first asset value and the fourth asset value.

In some implementations, generating the one or more transactions for the first commitment channel includes generating a timeout transaction, and wherein the timeout transaction is eligible to be broadcast by the principal node to the blockchain network after a first time-lock threshold has passed.

The present invention also provides a computing device for carrying out a method as defined above.

The present invention also provides a non-transitory processor-readable medium storing processor-executable instructions, where the processor-executable instructions, when executed by a processor, cause the processor to carry out a method as defined above.

These and other aspects of the present application will be apparent from and elucidated with reference to, the embodiments described herein.

An embodiment of the present application will now be described, by way of example only, and with reference to the accompany drawings, in which.

The present application provides a digital resource repository system for use on a blockchain network for verifying that digital resources (e.g. documents, software, data, other digital assets etc) submitted to the repository system have not been altered after being submitted and for ensuring that contents of submitted documents may not be revealed to other participating nodes until such time that each participating node reveals at least a private key share for decrypting an encrypted document. We will use the term "document" hereafter for convenience. However, any type of digital resource to which access needs to be controlled and/or verified falls within the scope of the invention.

The following description provides implementations, use cases, and illustrations relating to blockchain protocols, including the Bitcoin protocol. However, the present application has wider applicability and may be used in other systems and computer-based resources, and the present application is not limited in this regard.

In the present application, respective nodes submit a document to the document repository system via state-based transactions for eventual broadcast to the blockchain network. Upon submission of a document to the document repository system, respective nodes participating in verifying said document or documents submitted by other nodes may reveal a private key share via a reveal or rescind transaction. Further, when the respective nodes broadcast the reveal transaction to the blockchain network, the respective nodes provide a nodal private key for revealing contents of the document submitted by that respective node. As such, the document repository system described herein enables immutability of submitted documents and temporal integrity to a document selection process among participating nodes.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
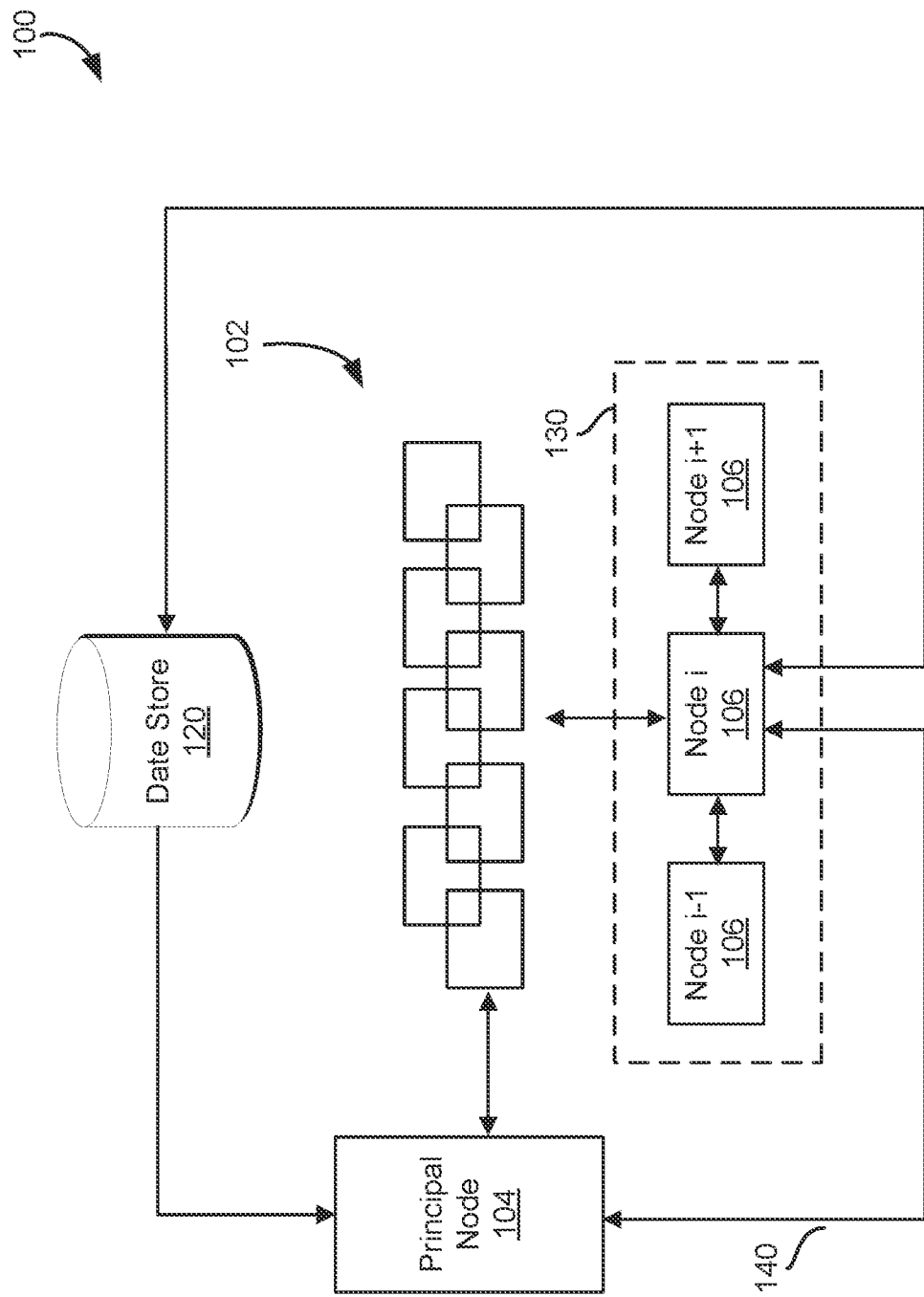
FIG. 1 illustrates, in block diagram form, a document repository system, in accordance with an example of the present application.

Reference is now made to FIG. 1, which illustrates, in block diagram form, a document repository system 100, in accordance with an example of the present application. The document repository system 100 may include a blockchain network, such as a peer-to-peer open membership network. Any number of nodes may join the blockchain network, without invitation or without consent from other nodes. The blockchain network includes an electronic ledger 102, which in turn may be made up of transactions. Each transaction is a data structure that encodes transfer of control of a digital asset or value.

The document repository system 100 may include one or more nodes 106. The nodes 106 may be electronic devices and may execute a blockchain protocol. The nodes 106 may be various types of electronic devices including, for example, computers (e.g., desktop computers, laptop computers, tablet computers, servers, etc.), mobile devices (e.g., smartphones, wearable computers such as smart watches), or other types of electronic devices. The nodes 106 may be coupled to one another using suitable communication technologies which may include wired or wireless communication technologies. In some examples, the document repository system 100 may be implemented at least partly over the Internet, and some of the nodes 106 may be located in geographically dispersed locations.

The one or more nodes 106 may maintain the electronic ledger 102 of one or more transactions. Each node 106 may store a complete copy or a partial copy of the global ledger. Transactions affecting the electronic ledger 102 may be verified by one or more nodes 106 so that validity of the electronic ledger 102 may be maintained. Details of implementing and operating a blockchain network, such as the Bitcoin protocol, may be appreciated by those of ordinary skill in the art.

In some implementations, each of the respective nodes 106 may have a nodal private-public key pair $(q_i, Q_i)$. The respective nodes 106 may generate the nodal private-public key pairs, where the nodal private-public key pairs may be used as "one-time code". For example, the nodal public key $(Q_i)$ of the nodal private-public key pair may be used together with an encryption method for encrypting a document. The nodal private key $(q_i)$ may be distributed in response to satisfaction of operations of a protocol (e.g., as described herein), and may be used together with a decryption method for decrypting the encrypted document. Thus, once the nodal private key of the nodal private-public key pair is published, that node 106 may refrain from using said nodal private-public key pair for future encryption operations.

The document repository system 100 may include a principal node 104. The principal node 104 may interface with the one or more nodes 106 and other components of the document repository system 100. As described herein, the principal node 104 may perform operations described herein for forming commitment channels with respective nodes 106 and may perform operations described herein for the document repository system 100.

The document repository system 100 may include a data store 120. The data store 120 may collect and store documents. The collected and stored documents may be encrypted documents. In some examples, the data store 120 may include a hash of respective documents or a hash of a hashed respective document (e.g., double hash). Hashing a document may map that document having an arbitrary size to data of a fixed data size.

The data store 120 may be accessible by the one or more nodes 106 or the principal node 104. A document may be any electronic digital file, such as a long detailed multipage entry, or a number. In some examples, a document can be a small finite set of characters and concatenated with a nonce (e.g., random number).

Encrypted documents stored in the data store 120 may be encrypted with a document crypto public key $(L_i)$. The document crypto public key $(L_i)$ may be defined as $L_i=P+Q_i$, where the collective private key (p) corresponding to the collective public key P may initially be unknown to the nodes 106 of the document repository system 100.

For example, a first node 106 may generate the document crypto public key by combining a first nodal public key $(Q_i)$ of the first nodal private-public key pair $(q_i, Q_i)$ and a collective public key (P) of the collective private-public key pair. The collective private key (p) of the collective private-public key pair may be based on a set of respective private key shares. The respective private key shares may be distributed, for example, according to a threshold secret sharing method. Further, the collective private key (p) may be generated when a set of private key shares are retrieved from each of the respective nodes 106. As described herein, the collective private key (p) may be generated when the set (or a sufficient/threshold number) of private key shares have been revealed by the respective nodes 106, such that the respective nodes 106 may collaboratively reveal or verify the encrypted document stored at the data store 120. As described herein, the respective nodes 106 may reveal their private key share by broadcasting a valid subsequent transaction, such as a reveal transaction or rescind transaction.

The one or more nodes 106 in the document repository system 100 may perform one or more operations of a threshold secret sharing protocol. For example, the one or more nodes 106 may perform operations of a threshold secret sharing protocol for distributing or assigning private key shares to respective nodes 106. Respective private key shares may be used for revealing or decrypting one or more documents stored in the data store 120. The one or more nodes 106 collaboratively performing operations according to a threshold secret sharing protocol can be organized into a cluster of nodes 130, as illustrated in FIG. 1.

In some examples, the threshold secret sharing protocol may be defined by a (t; n) threshold, where n may be the number of participating nodes 106 and t+1 may be a minimal number of nodes required to reconstruct a secret. Secret sharing schemes can be examples of threshold crypto systems, where a secret may be divided into portions among n nodes, such that at least t+1 nodes are required to participate in order to reconstruct the secret. Knowledge of any t portions may leave the secret unrevealed.

One example of a threshold secret sharing solution is described in an article entitled "How to share a secret" by Shamir, A. (1979) published in *Communications of the ACM*, 22(11), 612-613 ("Shamir method"). The Shamir method may be based on polynomial interpolation and w.l.o.g. the secret is assumed to be an element of a finite field F. The Shamir method may include a dealer or a dealerless method and may include a set of n nodes $U_1, \ldots, U_n$ and an access structure A. The groups of participants may be able to reconstruct the secret. With the Shamir method, an arbitrary random secret is stored as $f(0)$ in a t degree polynomial $f(x)$ and only participant i can calculate its share $f(x_i)$. If t+1 out of n participants collaborate, they can reconstruct any point on $f(x)$, with their shares (of the key k) $k_1, k_2, \ldots, k_n$ which correspond to $f(x_1), f(x_2), \ldots, f(x_n)$ using Lagrange Polynomial Interpolation. Using the Lagrange Polynomial Interpolation, a function $f(x)$ with degree t can be reconstructed with t+1 points $$p = \{(x_1, f(x_1)), (x_2, f(x_2)), \ldots, (x_{t+1}, f(x_{t+1}))\}$$

$$f(x) = \sum_{i \in p} f(x_i) \prod_{j \in p, j \neq i} \frac{x - x_j}{x_i - x_j} = \sum_{i \in p} f(x_i) b_{i,p}(x)$$

where $$b_{i,p}(x) = \prod_{j \in p, j \neq i} \frac{x - x_j}{x_i - x_j}$$

Note that $b_{i,p}(x_i)=1$ and $b_{i,p}(x_j)=0$.

In the presence of a dealer node, the dealer node may select a secret $a_0=k$, assumed to be an element of the finite field F of size p (p prime), and may randomly pick t−1 positive integers $a_1, \ldots, a_{t-1}$, which represent the coefficient of the polynomial $f(x)=a_0+a_1x+a_2x_2+\ldots$. The dealer node may then computes n points $(x_i, f(x_i))$ belonging to the polynomial and distribute them to the participants.

In the Shamir dealerless shares distribution phase:
1. Each participant $U_i$ is assigned $x_i$ which is known by everyone. Each $x_i$ has to be unique.
2. Each player $U_i$ generates a random polynomial $f_i(x)$ with degree t.
3. Each player $U_i$ secretly sends (encrypted with the recipients' public key) every other player their respective point on the polynomial, $f_i(x_j)$ mod n.
4. Each player $U_i$ sums all their received $f_1(x_i)$, $f_2(x_i), \ldots f_p(x_i)$ (all mod n, where n is the order of the group generated by the point G on the elliptic curve) to form $k_i=f(x_i)$ mod n, which is a share on the polynomial $f(x)$ mod n.

The above description of the Shamir method is one example of a threshold secret sharing solution; however, other methods or threshold secret sharing solutions may be contemplated.

In some implementations, threshold signature calculations may be based on determination of k×G where k is the secret key and G is a point on the Elliptical Curve.

If $f(x)$ is a t-degree polynomial, secret k can be interpolated by $k = \sum_{i \in \pi} b_{i,\pi} k_i$ where $\pi$ may be a size t+1 subset of shares $k_a, k_b, \ldots, k_t, k_{t+1}$ and b may be an interpolating factor. $\pi$ may be a group of t+1 nodes collaborating to calculate k×G without revealing its share $k_i$. k may be the x=0 point on a t-degree polynomial Each node $U_i$ may calculate a part $b_{i,\pi} k_i \times G$ All nodes in $\pi$ may add their part together (reconstructing the secret k via Lagrange interpolation) giving:

$$b_{a,\pi} k_a \times G + b_{b,\pi} k_b \times G + \ldots + b_{t+1,\pi} k_{t+1} \times G = k \times G$$

The above described process of calculating Q=kG may be referred to as Secret Share Joining.

In some implementations, the threshold secret sharing operations may result in allocation of a respective private key share ($p\hat{}_i$) to each of the one or more nodes 106 of the document repository system 100, such that a collective private key (p) of a collective private-public key pair (p, P) is based on a set of the respective private key shares. For example, the collective private key (p) may be generated or regenerated based on a set of the respective private key shares that may be represented as:

$$p = f(\hat{p}_1, \hat{p}_2, \ldots, \hat{p}_{n-1}, \hat{p}_n)$$

Thus, if there are n nodes 106 in the document repository system 100, each of the n nodes 106 may be allocated a private key share ($p\hat{}_i$), where n or a threshold quantity of key shares may be required to generate the collective private key of the collective public key P in the collective private-public key pair (p, P).

The principal node 104 and a respective node 106 may form a commitment channel 140. The commitment channel 140 may be an example of a state channel implementation, which represents an off-chain alteration of state and which is secured by eventual settlement on a blockchain network/electronic ledger 102. In some examples, the document commitment channel 140 may include a series of transactions generated by or signed by one or both of the principal node 104 or anode 106, as the case may be, for exchange prior to broadcasting those transactions to the blockchain network. Transactions of the commitment channel 140 may be held off the blockchain network, functioning akin to promissory notes for eventual broadcast onto the blockchain network. Thus, as exemplified herein, when the principal node 104 and a respective node 106 forms the commitment channel 140, operations may include generating or signing transactions by one or both of the principal node 104 or a node 106 and may further include broadcasting at least one of those transactions to the blockchain network to form that commitment channel 140. Because transactions based on the commitment channel 140 can be exchanged between the principal node 104 and a respective node 106 "off" the blockchain network, the transactions may be exchanged without latency typically associated with broadcasting and validating transactions on the blockchain network.

For ease of exposition, a commitment channel 140 is illustrated in FIG. 1 as between the principal node 104 and a selected node 106 (e.g., Node i). However, in some examples, respective commitment channels 140 may be formed between the principal node 104 and each of the one or more nodes 106 participating in collectively verifying or in collectively revealing a document available in the data store 120.

Figure 2:
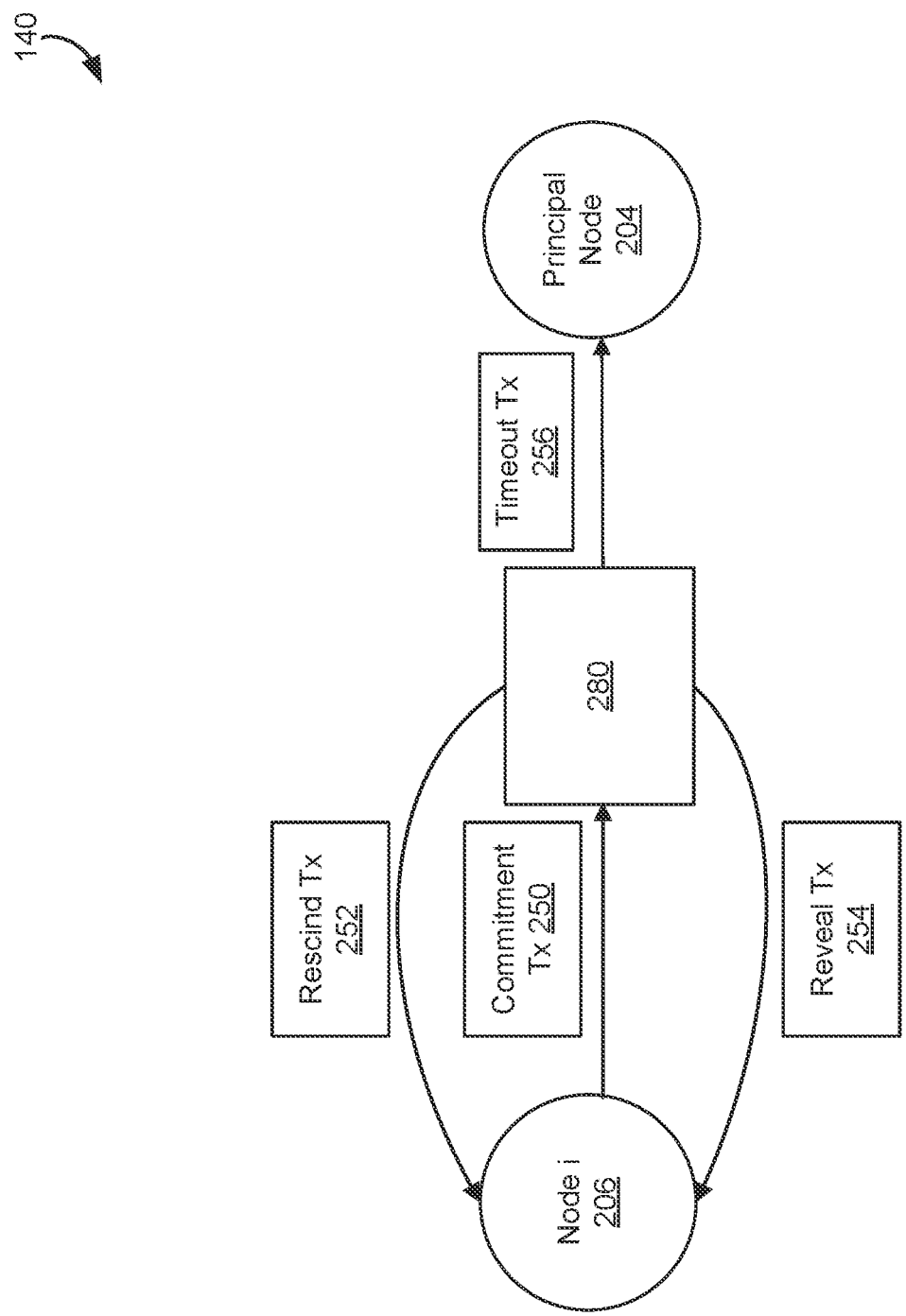
FIG. 2 illustrates, a commitment channel, in accordance with an example of the present application.

Reference is now made to FIG. 2, which diagrammatically illustrates a commitment channel 140, in accordance with an example of the present application. In some examples, a node 206 or the principal node 204 may form a commitment channel 140 by generating a commitment transaction 250 and at least one other valid subsequent transaction signed by the principal node 204, and transmitting that commitment transaction 250 to the blockchain network. In some examples, the valid subsequent transaction may include a rescind transaction 252 or a reveal transaction 254. Further, either the node 206 or the principal 204 may generate a timeout transaction 256.

FIG. 2 further illustrates an encumbered digital asset 280. The commitment transaction 250 may include an unspent transaction output (UTXO) including an encumbrance of the digital asset 280. As described herein, the encumbered digital asset 280 diagrammatically illustrated in FIG. 2 may be allocated in response to a valid subsequent transaction, such as a rescind transaction 252, a reveal transaction 254, or a timeout transaction 256.

The node 206 may generate a commitment transaction 250 to broadcast to the blockchain network that a document generated by that node 206 is saved at the data store 120. The node 206 may generate the document that the node 206 may wish to store at the data store 120 (FIG. 1) and may wish to disseminate to other nodes via the document repository system 100. In some implementations, the contents of the generated document may not be stored or recorded by transactions on the blockchain network. However, a hash of the document (HoD$_i$) may be recorded by one or more transactions. The hash of the document may correspond to an encrypted document that can be stored in the data store 120. In some examples, a double hash of the generated document (e.g., H(HoD$_i$)) may be recorded by a transaction that is broadcast to the blockchain network. A hash function may: (1) map data of an arbitrary size to data of a fixed size, such that the generated document can be represented in a blockchain transaction within a defined amount of data; or (2) prevent a node 106 from altering the generated document that may be stored at the data store 120. Hashing an altered document will yield a different hash result and may indicate that the document stored at the data store 120 has been altered.

To illustrate examples of the commitment transaction 250, the rescind transaction 252, the reveal transaction 254, and the timeout transaction 256, reference is now made to FIGS. 3A to 3D, which diagrammatically illustrate the respective transactions of the commitment channel 140, in accordance with examples of the present application. In some implementations, the transactions may include a locking script (e.g., <scriptPubKey>), which can be an output of the transaction that may encumber a digital asset or value by imposing rules or criteria that an unlocking script (e.g., <scriptSig>) of a valid subsequent transaction must satisfy to unencumber the digital asset or value of the prior transaction.

Figure 3A:
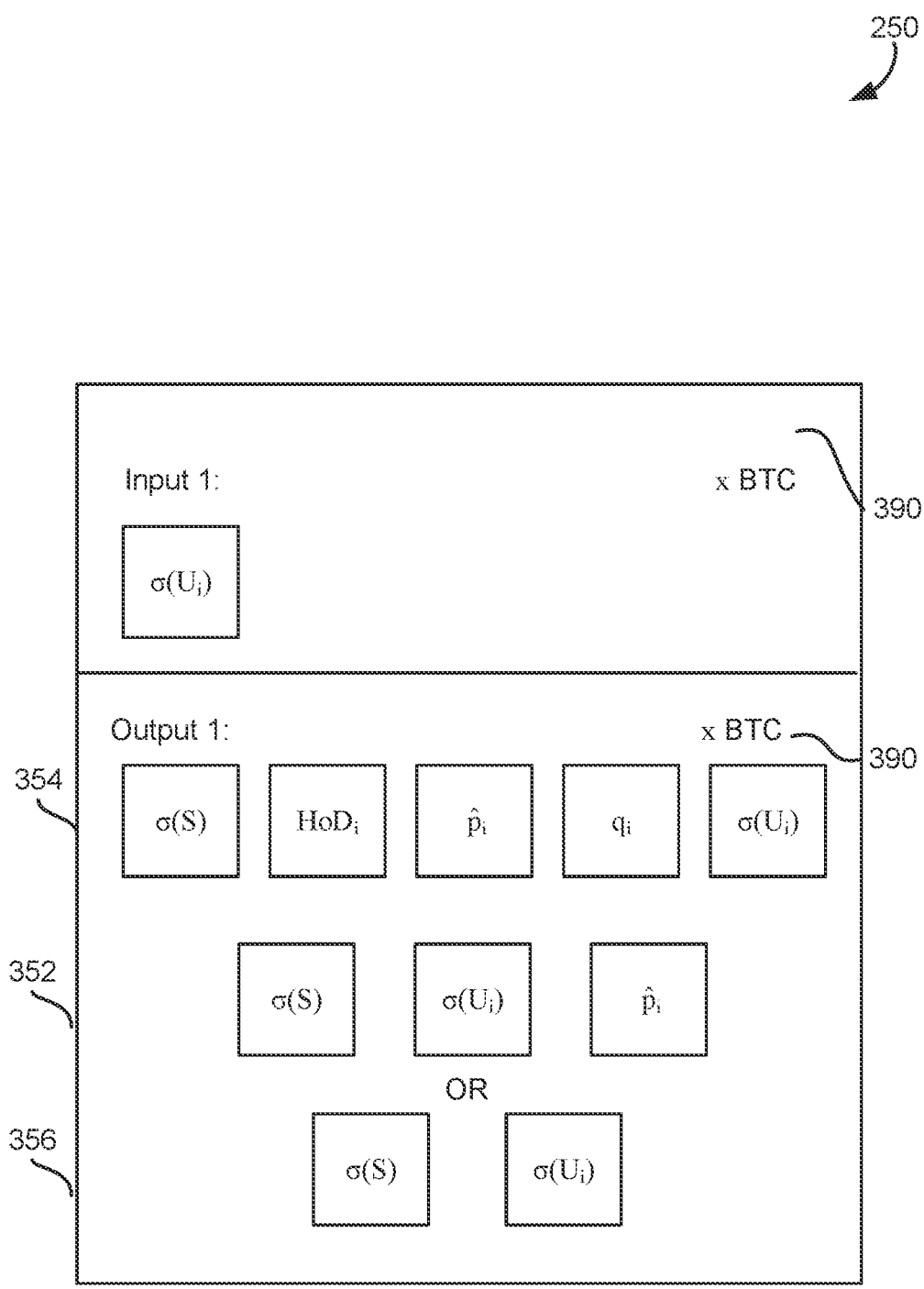
FIG. 3A illustrates a commitment transaction, in accordance with an example of the present application.

FIG. 3A diagrammatically illustrates an example commitment transaction 250. A node 106 (FIG. 1) may generate the commitment transaction 250 for submitting a document to the document repository system 100 (FIG. 1) for consideration by the principal node 104 (FIG. 1) or by other nodes 106 (FIG. 1). When the node 106 submits the document to the document repository system 100 for consideration, the node 106 may also submit a digital asset 390. The document repository system 100 may require submission of the digital asset 390 of a specified value in exchange for consideration of the submitted document by the principal node 104. The commitment transaction 250 may setup an encumbrance of the digital asset 390 until such time that a valid subsequent transaction allocates the digital asset 390.

The commitment transaction 250 may include one or more options for unencumbering the digital asset 390. The digital asset 390 may represent a first asset value. The options for unencumbering the digital asset may be specified in a locking script of the UTXO, such that the unlocking script of a valid subsequent transaction must contain required inputs prior to being able to unencumber the digital asset 390. For example, a withdraw or rescind option 352 may require that an unlocking script of a valid subsequent transaction provide a signature of the principal node 104 (e.g., $\sigma(S)$), a private key share of the node 106 (e.g., $\hat{p}_j$), and a signature of the node 106 (e.g., $\sigma(U_i)$) for selecting the withdraw option. The valid subsequent transaction that can include these inputs may correspond to the rescind transaction 252 (FIG. 2), as described herein. That is, in some examples, the commitment transaction has a transaction output that includes more than one unlocking options including a rescind option that requires the private key share of a first node, a signature of the principal node, and a signature of the first node, such that a valid subsequent transaction includes a transaction input with said private key share of the first node, said signature of the principal node, and said signature of the first node for selecting the rescind option.

In some implementations, the locking script of the commitment transaction 250 may include a reveal option 354. The reveal option 354 may require that an unlocking script of a valid subsequent transaction provide a signature of the principal node 104 (e.g., $\sigma(S)$), a hash of the encrypted document (e.g., HoD$_i$), a private key share of the node 106 (e.g., $\hat{p}_i$), a nodal private key (e.g., $q_i$) of the node 106, and a signature of the node 106 (e.g., $\sigma(U_i)$) for selecting the reveal option. The valid subsequent transaction that can include these inputs may be the reveal transaction 254 (FIG. 2), as described herein. That is, in some examples, the commitment transaction has a transaction output that includes more than one unlocking options including a reveal option that requires a hash of the document, the private key share of a first node, a first nodal private key of the first nodal private-public key pair, a signature of the principal node, and a signature of the first node, such that a valid subsequent transaction includes a transaction input with said hash of the document, said private key share of the first node, said first nodal private key of the first nodal private-public key pair, said signature of the principal node, and said signature of the first node for selecting the reveal option.

In some implementations, the locking script of the commitment transaction 250 may include a timeout option 356. The timeout option 356 may require that an unlocking script of a valid subsequent transaction provide a signature of the principal node 104 (e.g., $\sigma(S)$) and a signature of the node (e.g., $\sigma(U_i)$) for selecting the timeout option. The valid subsequent transaction that can include these inputs may correspond to the timeout transaction 256 (FIG. 2). As described herein, when the node 106 submits neither the rescind transaction 252 nor the reveal transaction 254 within a first time-lock threshold period, the principal node 104 may broadcast the timeout transaction 356 to the blockchain network after that first time-lock threshold has passed. The timeout transaction 356 can include an unlocking script for providing the signature of the principal node 104 and the signature of the node for the timeout option 356. That is, in some examples, the commitment transaction has a transaction output that includes more than one unlocking options including a time out option that requires a signature of the principal node and a signature of the first node, such that a valid subsequent transaction includes a transaction input with said signature of the principal node and said signature of the first node for selecting the timeout option. In some implementations, the signature (e.g., $\sigma(U_i)$) of the node (U$_i$) contained in the transaction input of the commitment transaction 250 and a signature of the node (U$_i$) contained in the transaction output of the commitment transaction 250 may be based on different public-private key pairs of that node. For example, that node (U$_i$) may have more than one public-private key pair and may generate signatures for different aspects of the commitment transaction 250 or other transactions for the commitment channel 140.

In some implementations, the commitment transaction 250 may also include a double-hash of the document (H(HoD$_i$)) (not illustrated in FIG. 3A) generated by the node 106. The node 106 may generate the double-hash of the document when the node 106 may submit that document to the document repository system 100. A hash function H($\theta$) may: (1) map data of an arbitrary size to data of a fixed size, such that the generated document can be represented in a blockchain transaction within a defined amount of data; or (2) prevent any node 106 from altering the generated document that may be stored at the data store 120. Hashing an altered document may yield a different hash result and may indicate that the document stored at the data store 120 has been altered.

Figure 3B:
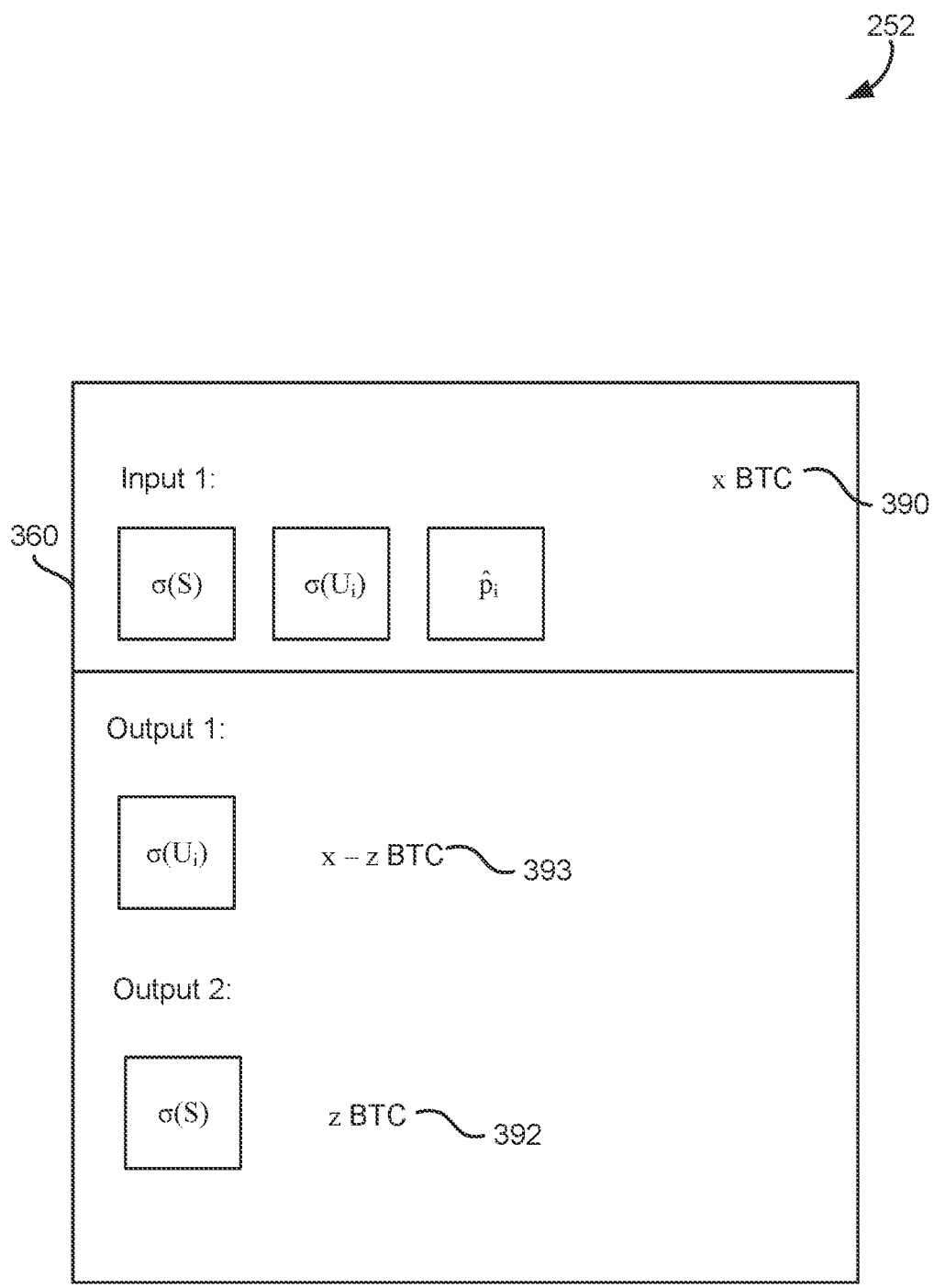
FIG. 3B illustrates a rescind transaction, in accordance with an example of the present application.

FIG. 3B diagrammatically illustrates an example rescind transaction 252. When forming the commitment channel 140, the node 106 may generate the rescind transaction 252. The node 106 may broadcast the rescind transaction 252 to the blockchain network in the circumstance that the node 106 has submitted a document to the document repository system 100 but subsequently does not intend to have that document considered for selection by the principal node 104 or any other nodes 106. In particular, the node 106 may generate the rescind transaction 252 that includes a transaction input 360 having a private key share (e.g., $\hat{p}_j$) of the node 106, a signature of the node 106 (e.g., $\sigma(U_i)$), and a signature of the principal node 104 (e.g., $\sigma(S)$). As will be described, the principal node 104 may sign the rescind transaction 252 when the principal node 104 verifies that the rescind transaction 252 includes mandated transaction inputs and transaction outputs for the commitment channel 140 for the principal node 140 and that respective node 106. Because the rescind transaction 252 includes the private key share of the node 106, the rescind transaction 252 may provide sufficient information that may contribute to decryption of documents submitted by other nodes 106.

The rescind transaction 252 may include a transaction output having two outputs for encumbering at least two asset values. For example, the rescind transaction 252 may include an output for encumbering a second asset value 392 and a third asset value 393. Thus, an encumbrance on the second asset value 392 may be removed in response to a transaction input of a further transaction having the signature of the principal node (e.g., $\sigma(S)$). An encumbrance on the third asset value 393 may be removed in response to a transaction input of a further transaction having the signature of the node 106 (e.g., $\sigma(U_i)$). The second asset value 392 may be less than the first asset value 390. Further, the third asset value 393 may be a difference between the first asset value 390 and the second asset value 392. Thus, in some examples, the second asset value 392 may be a fee when the node 106: (1) submits a generated document to the data store 120; but (2) withdraws the document from consideration by the principal node 104. The third asset value 393 may represent an unencumbered asset value that may be returned to the node 106 that broadcasted said rescind transaction 252.

Note that when the node 106 broadcasts the rescind transaction 252 to the blockchain network, the rescind transaction 252 includes the signature of the principal node 104, the signature of that node 106, and the private key share ($\hat{p}_i$) of that node 106; however, the nodal private key (e.g., $q_i$) of that node 106 is not included. Without the nodal private key ($q_i$) of that node 106, any encrypted document ($Enc_L(Doc_i)$) that was: (1) previously generated by that node 106; and (2) encrypted using the document crypto public key (e.g., $L_i=P+Q_i$) may not be decrypted by any of the other nodes 106 because none of the other nodes 106 may determine a document crypto private key $l_i=p+q_i$. When the node 106 fails to provide the nodal private key ($q_i$), the document crypto private key may not be generated.

Note also that when the node 106 broadcasts the rescind transaction 252 to the blockchain network, the private key share ($\hat{p}_i$) of that node 106 may be included in the transaction input. Thus, the collective private key (p) may be generated, allowing for other nodes 106 to decrypt encrypted documents using a private document crypto key $p+q_i$, where $q_i$ is the nodal private key of the nodal private-public key pair ($q_i$, $Q_i$) for respective nodes 106 and when $q_i$ is available on the blockchain network.

Figure 3C:
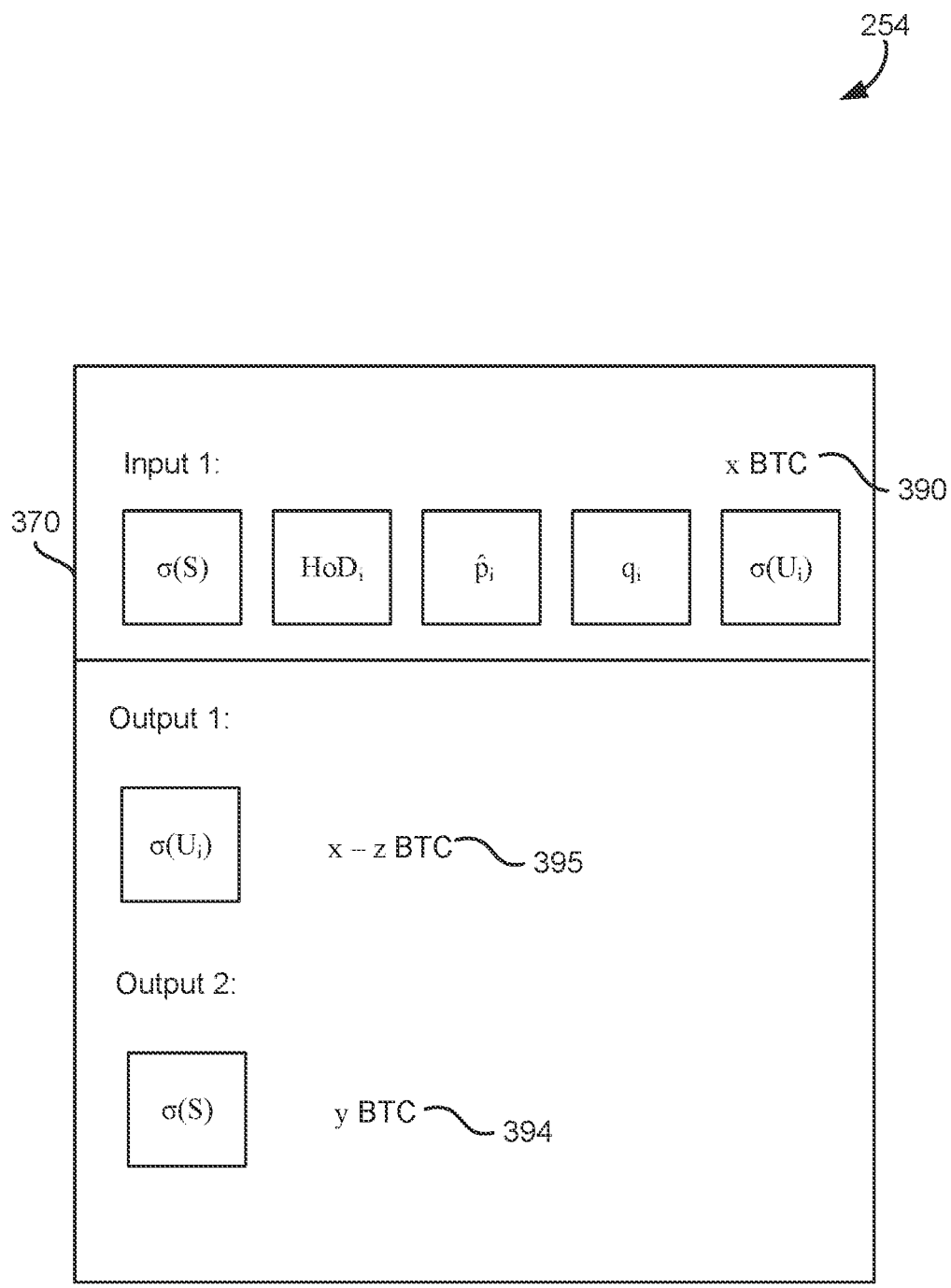
FIG. 3C illustrates a reveal transaction, in accordance with an example of the present application.

FIG. 3C diagrammatically illustrates an example reveal transaction 254. When forming the commitment channel 140, the node 106 may generate the reveal transaction 254. The node 106 may broadcast the reveal transaction 254 to the blockchain network in the circumstance that the node 106 has submitted a document to the document repository system 100 and intends to have that document considered for selection by the principal node 104 or any other node 106. By intending that document to be considered for selection, the encrypted version of that document may be decrypted using a document crypto private key $l_i=p+q_i$. As the transaction input of the reveal transaction 254 may include both the private key share ($\hat{p}_i$) of that node 106 and the nodal private key ($q_i$) of the nodal private-public key pair ($q_i$, $Q_i$), any of the principal node 104 or the other nodes 106 may decrypt that document stored at the data store 120, provided that a threshold number of other nodes reveal a respective private key share.

In particular, the reveal transaction 254 may include a transaction input 370 that may include a signature of the principal node ($\sigma(S)$), a hash of the encrypted document ($HoD_i$), a key share of the node 106 ($\hat{p}_i$), a nodal private key of the node 106 ($q_i$), and a signature of the node 106 ($\sigma(U_i)$). As will be described, the principal node 104 may sign the reveal transaction 254 (e.g., ascribe $\sigma(S)$ to the reveal transaction 254) when the principal node 104 verifies that the reveal transaction 254 includes mandated transaction inputs and transaction outputs for the commitment channel 140 for the principal node 104 and that respective node 106. Because the reveal transaction 254 includes the private key share of the node 106 as well as the nodal private key of the nodal private-public key pair ($q_i$, $Q_i$) for that respective node 106, the reveal transaction 254 may provide sufficient information that may allow decryption of documents. That is, the reveal transaction 254 may provide sufficient information for determining a document crypto private key $l_i=p+q_i$.

The reveal transaction 254 may include a transaction output having two outputs for encumbering at least two asset values. For example, the reveal transaction 254 may include an output for encumbering a fourth asset value 394 and a fifth asset value 395. An encumbrance on the fourth asset value 394 may be removed in response to a transaction input of a further transaction having the signature of the principal node (e.g., $\sigma(S)$). An encumbrance on the fifth asset value 395 may be removed in response to a transaction input of a further transaction having the signature of the node 106 (e.g., $\sigma(U_i)$). The fourth asset value 394 may be less than the first asset value 390 (FIGS. 3A and 3B). Further, the fifth asset value 395 may be a difference between the first asset value 390 and the fourth asset value 394. Thus, in some examples, the fourth asset value 394 may be a fee for submitting a generated document to the data store 120 for consideration and subsequent verification by the principal node 104 or any other node 106 participating in the document repository system 100. The fifth asset value 395 may represent an unencumbered asset value that may be returned to the node 106 that broadcasted said reveal transaction 254.

In some examples, the document repository system 100 may be structured to encourage the respective nodes 106 to broadcast a reveal transaction 254, rather than to broadcast a rescind transaction 252. Thus, the fourth asset value 394 may be less than the second asset value 392 (FIG. 3B) of the rescind transaction 252 (FIGS. 2 and 3B). Note that for ease of exposition, any transaction fees that may be attributed to mining/validating nodes of the blockchain network in accordance with a blockchain protocol (e.g., bitcoin protocol)

have not been included in the description of encumbering and unencumbering of the digital assets.

Figure 3D:
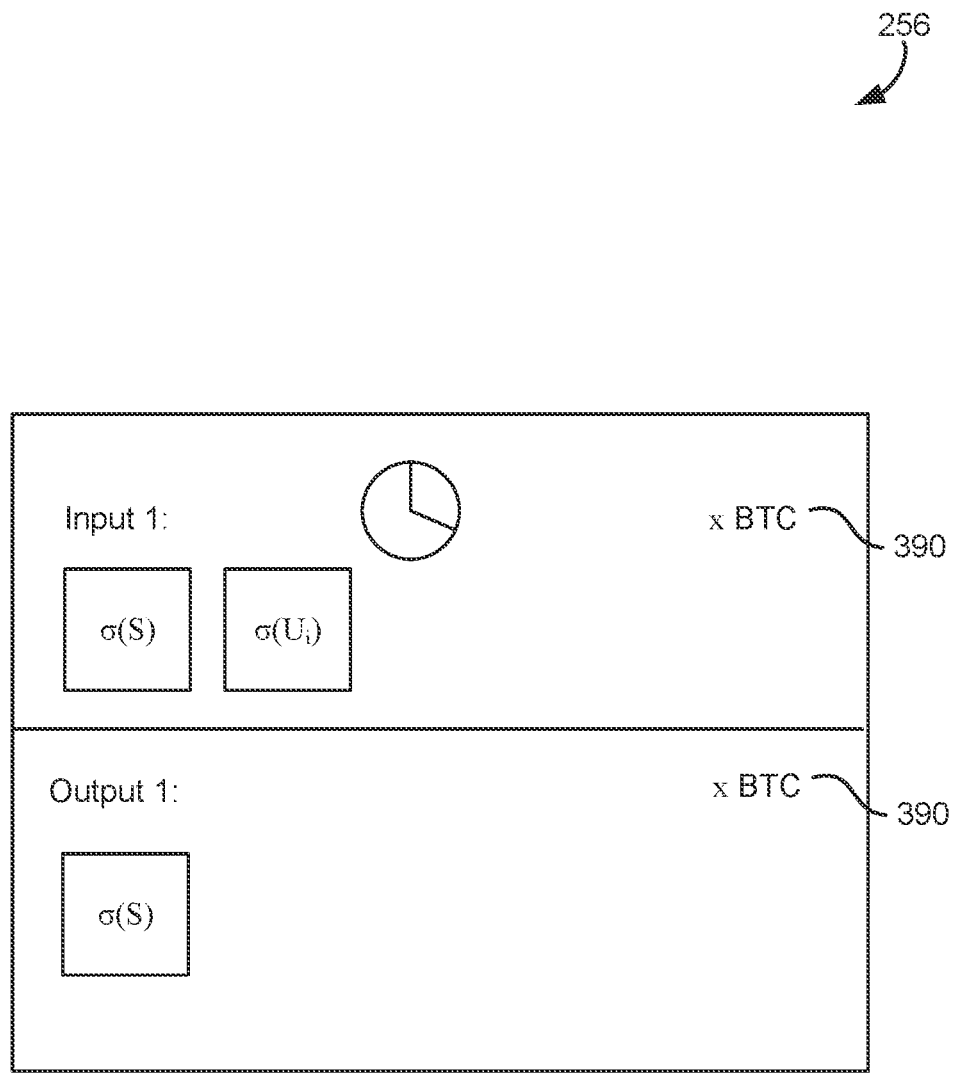
FIG. 3D illustrates a timeout transaction, in accordance with an example of the present application.

FIG. 3D diagrammatically illustrates an example timeout transaction 256. When forming the commitment channel 140, the principal node 104 or the respective node 106 may generate the timeout transaction 256. The principal node 104 may broadcast the timeout transaction 256 to the blockchain network in the circumstance that the node 106 has broadcast the commitment transaction 250 to the blockchain network, but the node 106 has not broadcast any valid subsequent transaction following the broadcasted commitment transaction 250. In some examples, the node 106 may not have broadcast a rescind transaction 252 or a reveal transaction 254 if the node 106 may have lost network communication with the blockchain network or may have gone offline.

The timeout transaction 256 may be an nLockTime-based transaction, such that the principal node 104 may not successfully broadcast the timeout transaction 256 to the blockchain network until a time-lock threshold has been passed. The time-lock threshold may be defined in terms of transaction block height of the electronic ledger 102 (FIG. 1) or UNIX time. As an example, the time-lock threshold may be a deadline for each of the nodes 106 to either broadcast a rescind transaction 252 or a reveal transaction 254 subsequent to the respective broadcast of the commitment transaction 250. Recall that the commitment transaction 250 may be representative of or an indication of an encrypted document being stored at the data store 120 (FIG. 1). That is, when a node 106 broadcasts a commitment transaction 250 to the block chain network, the node 106 may be broadcasting existence of that document in the document repository system 100.

When the node 106 fails to broadcast a withdraw transaction 252 or a reveal transaction 254 before the first time-lock threshold, the node 106 fails to provide the private key share ($\hat{p}_i$) and the nodal private key ($q_i$) of that node 106. Failure to reveal the private key share of that node 106 may prevent other nodes participating in the document repository system 100 from regenerating the collective private key (p) of the collective private-public key pair (p, P), thus preventing other nodes from decrypting encrypted documents stored at the data store 120. Further, failure to reveal the nodal private key ($q_i$) of that node 106 may prevent other nodes participating in the document repository system 100 from decrypting the encrypted document of that particular node 106. Recall that to decrypt the encrypted document, a document crypto private key ($l_i = p + q_i$) may be required.

The timeout transaction 256 may include a transaction output having an output for further encumbering the first asset value 390 by the principal node 104. That is, an encumbrance on the first asset value 390 may be removed in response to a transaction input of a further transaction having the signature of the principal node (e.g., σ(S)). In some examples, the document repository system 100 may require that the structure of the transaction output of the timeout transaction 256 encumber the first asset value 390 as a penalty to the node 106 who did not broadcast at least one of a withdraw transaction 252 or a reveal transaction 254 to the blockchain network prior to the first time-lock threshold (s1).

In some examples, said further transaction having the signature of the principal node (σ(S)) may include transaction outputs to distribute a portion of the first asset value to each of the other nodes 106 in lieu of each of the other nodes 106 being unable to decrypt encrypted documents that may be stored at the data store 120. Recall that each of the other nodes 106 may be unable to regenerate the collective private key (p) without private key shares from the set or at least some nodes 106.

In some examples, the nodes 106 may not broadcast the timeout transaction 256 to the blockchain network. Rather, the timeout transaction 256 may be broadcast by the principal node 204 to the blockchain network in the event that a respective node 106 fails to broadcast a reveal or rescind transaction prior to the first time-lock threshold. Because the timeout transaction 256 encumbers the first asset value 390 for the benefit of the principal node 204, each respective node 106 may not operate to broadcast the timeout transaction 256 to the blockchain network.

Figure 4:
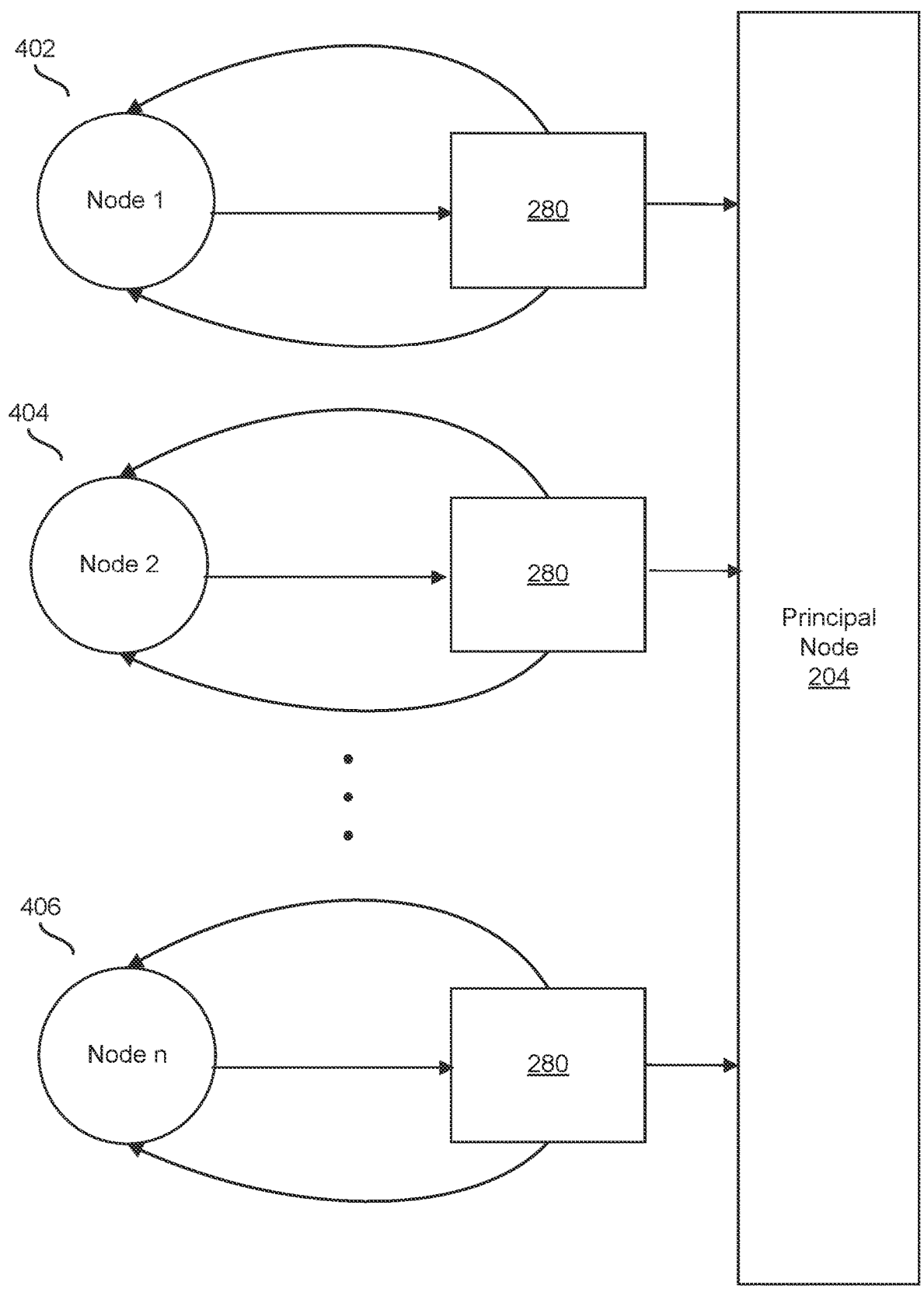
FIG. 4 illustrates commitment channels between the principal node and each of several nodes, in accordance with an example of the present application.

Reference is now made to FIG. 4, which diagrammatically illustrates commitment channels between the principal node 204 and each of several nodes, in accordance with examples of the present application. For example, a first commitment channel 402 may be formed for a "Node 1" and the principal node 204. A second commitment channel 404 may be formed for a "Node 2" and the principal node 204. A $n^{th}$ commitment channel 406 may be formed for a "Node n" and the principle node 204. Each of the respective commitment channels may be associated with encrypted documents that may be associated with a respective node and that may be stored in a data store. In some examples, the number of commitment channels in a document repository system may correspond to the number of nodes participating in verifying or revealing encrypted documents stored at a data store 120 (FIG. 1). Each of the first commitment channel 402, the second commitment channel 404, or the $n^{th}$ commitment channel 406 may be associated with a commitment transaction, a rescind transaction, a reveal transaction, or a timeout transaction having the similar features as those described in FIG. 2 and FIGS. 3A to 3D herein.

As described, nodes 106 (FIG. 1) may wish to submit one or more documents to the document repository system 100 (FIG. 1) for consideration by the principal node 104 (FIG. 1) or by other nodes 106. Submitting a document to the document repository system 100 may include transmitting an encrypted document to the data store 120 (FIG. 1) for storage and may include generating and broadcasting a commitment transaction to the blockchain network. In some examples, the encrypted document may not be specified or stored in a transaction that is broadcast to the blockchain network. Rather, a hash of the encrypted document (e.g., $HoD_i$) may be specified in a transaction that is broadcast to the blockchain network. The hash of the encrypted document may be used to broadcast to the blockchain network that the encrypted document is saved in the data store 120.

In some implementations, the principal node 104 may generate a request transaction requesting for document submissions from nodes 106. The request transaction may include locking scripts specifying, among other specifications, a quantity of document submissions that may be received, a quantity of nodes 106 that may make document submissions, or time-lock thresholds for (a) when submission of commitment transactions to the blockchain network may occur (e.g., up until a time-lock threshold), such as a submission threshold time period (s0); and (b) when submission of a subsequent valid transaction (e.g., rescind transaction 252 or reveal transaction 254) must be broadcast, such as a first threshold time period (s1). In some examples, the submission threshold time period (s0) may be implemented such that the document repository system 100 may receive encrypted documents from participating nodes for storage before proceeding with operations for decrypting said encrypted documents. In some examples, the request transaction may include specifications detailing use of Elliptic Curve Cryptography (ECC). For example, if the document repository system 100 is based on the Bitcoin protocol, the elliptic curve (secp256k1 ECDSA) having the following set of parameters may be used:

G—a base point on the elliptic curve with order q: $q \times G = 0$, and q=a large prime number.

In some implementations, a secret sharing protocol may be implemented to distribute n key shares to n nodes, where the n nodes may submit one or more documents to the document repository system 100. As described herein, the n key shares may be used to generate a collective private key (p) associated with a collective public key (P) of a collective private-public key pair (p, P). In some implementations, the collective private key shares may be distributed by a trusted dealer node. When a trusted dealer node distributes collective private key shares, the trusted dealer node may be the principal node 104 and may have knowledge of the collective private key for generating the collective private key shares for the participating nodes.

In some other implementations, the collective private key shares may be distributed based on a dealerless protocol. With a dealerless protocol, no particular node has prior knowledge of the collective private key share, and the protocol may require at least t+1 of n keyshares for generating the collective private key (p). When a polynomial-based secret share protocol is used, "t" may be the degree of that polynomial. The dealerless protocol may require that the n nodes collaborate to generate and validate the respective collective private key shares.

In some example implementations, the threshold t+1 may be t∈Z: 0<t≤n−1, where t may be a quantity such that t+1≠n. The example implementation where a threshold t+1≠n is used may be useful for scenarios where one or more nodes 106 may have broadcast a commitment transaction 250, but may have subsequently severed a network communication channel with the blockchain network, such that that particular node 106 would not broadcast a subsequent valid transaction from the respective commitment channel 140. Note that setting the threshold t+1≠n may ameliorate scenarios for the participating nodes 106 to regenerate the collective private key (p), even when one or more nodes may have severed a network communication channel with the blockchain network. Note that in the example implementation where the threshold may be t+1≠n, an encrypted document in the data store 120 may be decrypted prior to the entire set of nodes 106 broadcasting one of a rescind transaction 252 or a reveal transaction 254 to the blockchain network. Thus, when an encrypted document in the data store 120 may be decrypted prior to the entire set of nodes 106 broadcasting one of a rescind transaction 252 or a reveal transaction 254 to the blockchain network, nodes 106 that may not yet have broadcast one of a rescind transaction 252 or a reveal transaction 254 may reveal contents of other encrypted documents at the data store 120 and may broadcast one of a rescind transaction 252 or a reveal transaction 254 prior to passing of the first time-lock threshold based on such revelation.

In some example implementations, the document repository system 100 may utilize a secret sharing protocol utilizing an n+r threshold, such that n+r key shares may be required for generating the collective private key (p) of the collective private-public key pair (p, P). The additional r private key shares may be distributed to the principal node 104 or other trusted third parties. However, when using the secret sharing protocol with an n+r threshold, retrieving from the blockchain n private key shares would not be sufficient for generating the collective private key (p) for verifying integrity of or revealing an encrypted document at the data store 120.

In some example implementations, the nodes 106 of the document repository system 100 may perform operations of a Publicly Verifiable Secret Sharing (PVSS) protocol. It may be desirable that respective nodes be able to verify that the respective nodes are allocated correct secret key shares. Key share verification may be employed for allowing nodes to verify respective key share(s), as well as key share(s) of other nodes.

An example PVSS protocol is described in "Publicly verifiable secret sharing" from the *International Conference on the Theory and Applications of Cryptographic Techniques* (Springer Berlin Heidelberg), pages 190 to 199, by Stadler, M., published May 1996 [Stadler].

In an example PVSS protocol, each node $U_i$ may have a decryption function $D_i$, which is able to access the information encrypted with the corresponding public encryption function $E_i$. In this way, a dealer node may use the public encryption function to distribute key shares and publish them in the following form:

$$K_i = E_i(k_i), i=1, \ldots, n.$$

The encrypted shares can be publicly verified by an interested node. The nodes can verify its own key share(s) and can verify that the other nodes received correct key shares, i.e. whether the dealer node was honest or not.

The main (high level) components of the PVSS protocol include:
  (i) Secret sharing: the dealer node may run an algorithm Share(k)=($k_1$, . . . , $k_n$) to compute the shares and distribute them among the participating nodes.
  (ii) Reconstruction: participant nodes can reconstruct the secret by running the algorithm Recover, such that Recover ($\{D_i(K_i) | i \in A\}$)=k.
  (iii) Verification: an algorithm PubVerify may be used to validate the encrypted shares. If a node operates the algorithm PubVerify($\{K_i | i \in A\}$)=1→Recover ($\{D_i(K_i) | i \in A\}$)=u and u=k then the dealer node may be determined to be honest and the key shares may be consistent.

In some implementations, the PVSS scheme can be interactive or non-interactive depending on necessity in the recovery phase.

Various implementations of the PVSS protocol based on several cryptosystems may be contemplated. For illustration, the following highlights a protocol described in the publication "A simple publicly verifiable secret sharing scheme and its application to electronic voting" from the *Annual International Cryptology Conference* (Springer Berlin Heidelberg), pages 148 to 164, by Schoenmakers, B., published August 1999.

In an initialisation phase, using a public procedure, a group $G_q$ and two independently selected generators G and g may be chosen. Each node, given its private key $x_i \in Z_q^*$, may set $y_i = G^{x_i}$ as public key.

The dealer node may then select a random polynomial $f(x) = \sum_{j=0}^{t-1} a_j x^j$ of degree at most t−1 with coefficients in $Z_q$ and sets $a_0 = k$. The commitments $C_j = g^{a_j}$, j=0, . . . , t and the encrypted shares $f(i)$ (using the participants' public key) $Y_i = y_i^{f(x_i)}$, i=1, . . . , n may be published.

By computing $X_i = \Pi_{j=0}^{t-1} (C_j)^{i^j}$ the dealer node can show that the encrypted shares are consistent. In particular, the dealer node can produce a proof of knowledge of the $f(i)$ by showing that $X_i = g^{f(x_i)}$, $Y_i = y_i^{f(x_i)}$.

The verification of key shares can be performed using the Fiat-Shamir cryptographic technique in Stadler, cited above. The main steps of the non-interactive protocol include the following:

The prover (every node) may pick a random $w_i \in Z_q$, may compute $a_{1i}=g^{w_i}$, $a_{2i}=y_i^{w_i}$ and may broadcast the values.

Using $c=H(X_i, Y_i, a_{1i}, a_{2i})$ where $H( )$ is a cryptographic hash function, the prover (e.g., a node) may compute and broadcast $r_i=w_i-f(x_i)c$.

Given $r_i$, c, the verifier node may compute $a_{1i}=g^{r_i}X_i^c$, $a_{2i}=y_i^{r_i}Y_i^c$, and may prove that the hash of $X_i$, $Y_i$, $a_{1i}$, $a_{2i}$, $1 \le i \le n$, matches c.

When needed, the participant nodes can reconstruct the secret s, without having to learn anything about other nodes' shares $f(x_i)$. The information required may include $S_i = G^{f(x_i)}$, i=1, . . . , t. The secret is computed via Lagrange interpolation $$\Pi_{i=1}^t S_i^{\lambda_i} = \Pi_{i=1}^t (G^{f(x_i)})^{\lambda_i} = G^{\Sigma_{i=1}^t f(x_i)\lambda_i} = G^{f(0)} = G^k,$$

where $$b_{i,p}(x) = \prod_{j \in p, j \ne i} \frac{x - x_j}{x_i - x_j}$$

is a Lagrange coefficient.

The above example utilizes a dealer node for computing and distributing key shares. However, it may be contemplated that a dealerless implementation of the secret sharing protocol may be implemented as described by Fiat-Shamir heuristics techniques (see e.g., "Fiat-Shamir heuristic", https://en.wikipedia.org/wiki/Fiat%E2%80%93Shamir_heuristic, accessed Feb. 26, 2018).

As described, in some implementations, the nodes 106 may execute operations of a secret sharing joining protocol. The set of nodes may collaborate to generate the collective public key (P), where P=pG, where G may be the selected basepoint of the elliptic curve, and where p may be the collective private key (p).

Figure 5:
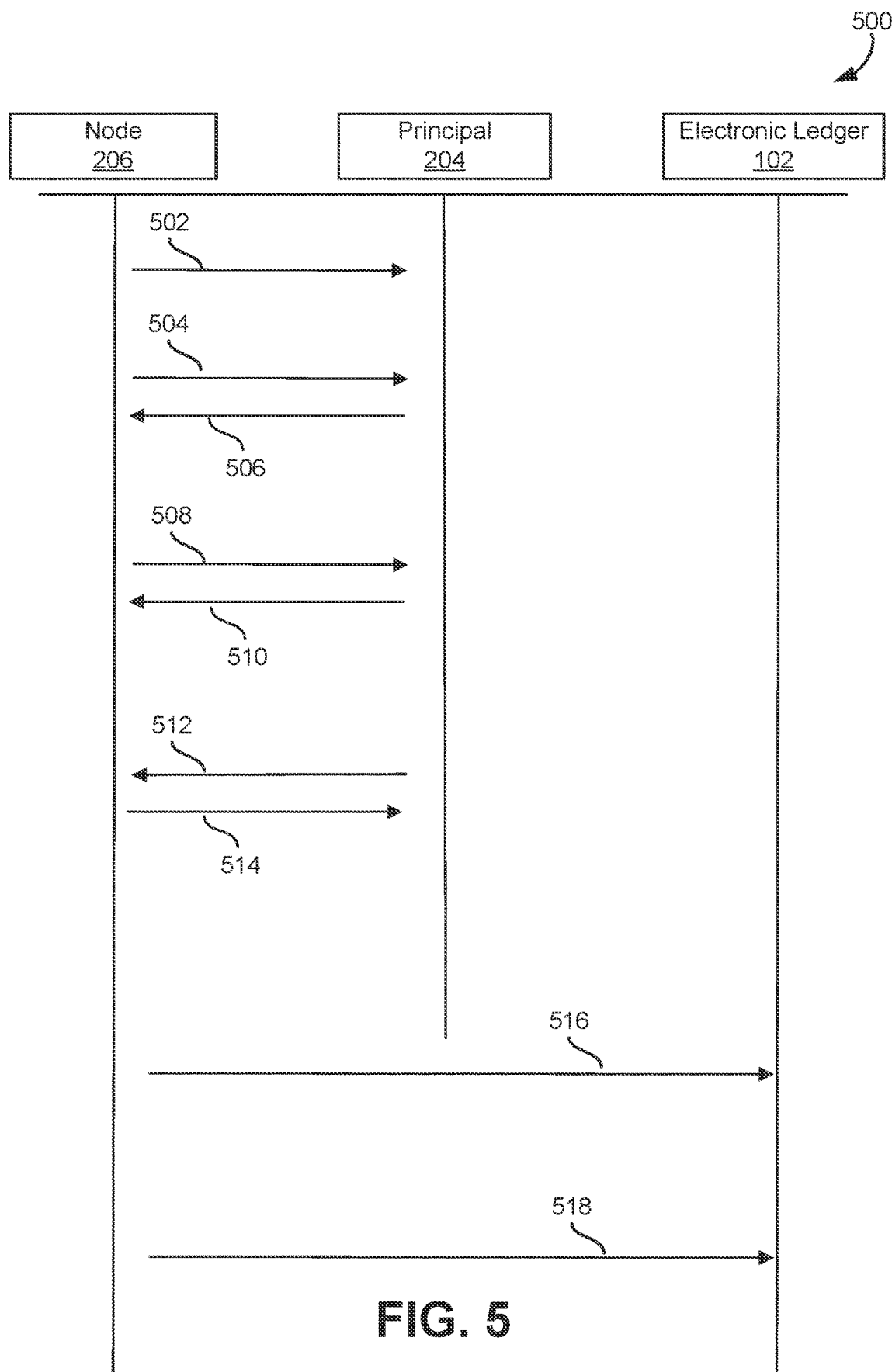
FIG. 5 illustrates a sequence diagram of transactions among a node, a principal node, and an electronic ledger, in accordance with an example of the present application.

As described, the nodes and the principal node may form a respective commitment channel based on generation of one or more transactions and broadcasting a commitment transaction to the blockchain network. To illustrate formation of an example commitment channel, reference is now made to FIG. 5, which illustrates a sequence diagram 500 of transactions exchanged between a node 206 (FIG. 2), a principal node 204 (FIG. 2), and an electronic ledger 102, in accordance with an example of the present application. The electronic ledger 102 may be a component of the blockchain network. For ease of exposition, in some examples, the blockchain network may be used to refer to the electronic ledger 102. The sequence diagram 500 may illustrate an example formation of the commitment channel 140 illustrated in FIG. 2.

At operation 502, the node 206 may generate a commitment transaction 250 (FIG. 2) having a commitment transaction output locked by a private key share of the node 206 such that a valid subsequent transaction having the commitment transaction output as an input is to include the private key share of the node 206. In some examples, the commitment transaction 250 may be similar to the commitment transaction 250 of FIG. 3A.

At operation 502, the node 206 may also transmit the commitment transaction 250 to the principal node 204. By generating and transmitting the commitment transaction 250 to the principal node 204, the node 206 may indicate to the principal node 204 that the node 206 is submitting a document to the document repository system 100. Further, at operation 502, the node 206 may transmit an encrypted document to the data store 120 (FIG. 1) for storage. The data store 120 may be publically accessible, such that the nodes 106 and the principal node 104 of the document repository system 100 may access encrypted documents stored therein; however, the nodes 106 or the principal node 104 may need to decrypt the encrypted documents using a document crypto private key ($l_i=p+q_i$), where p is the collective private key based on a set of collective private key shares distributed to the nodes 106 and $q_i$ is a nodal private key associated with the encrypted document.

In some examples, the commitment transaction 250 may be hashed and the node 206 may transmit a hash of the commitment transaction 250 to the principal node 204. In some implementations, the hash of the commitment transaction 250 may be an identifier ("ID") for referencing that commitment transaction 250. For example, the ID may be included a rescind transaction 252, a reveal transaction 254, or a timeout transaction 256 for identifying the corresponding commitment transaction 250. In some examples, a hash of the commitment transaction 250 may: (1) map the commitment transaction 250 to a fixed data size; and/or (2) assist with detecting subsequent alteration of the commitment transaction 250, as hashing an altered document may yield a different hash result. The principal node 204 or any of the nodes 106 may utilize expected hash results for determining whether the commitment transaction 250 may have been altered.

At 504, the node 206 may generate a valid subsequent transaction. The valid subsequent transaction may be a rescind transaction 252 similar to that illustrated in FIG. 3B. The rescind transaction 252 may include a transaction input having a private key share of the node 206 and a signature of the node 206. At 504, the node may also transmit the rescind transaction 252 to the principal node 204.

At 506, the principal node 204 may verify that the rescind transaction 252 includes the mandated transaction inputs and transaction outputs for the commitment channel 140. For example, the principal node 204 may verify that the rescind transaction 252 includes at least a signature of the node 206 or desired input or output asset values. In some examples, the node 206 may not yet provide the respective private key share ($\hat{p}_i$) of that node 206. Once the principal node 204 verifies that the rescind transaction 252 includes the mandated transaction inputs and transaction outputs, the principal node 204 may append or concatenate a signature of the principal node ($\sigma(S)$) to rescind transaction 252 and transmit the signed rescind transaction to the node 206. In some examples, the principal node 204 may append or concatenate a signature of the principal node without having knowledge of the private keyshare of the node 206. That is, at 506, the principal node 204 may be setting up the rescind transaction 252, such that the rescind transaction 252 may be subsequently broadcast to the blockchain network.

Note that exchange of the "unsigned" and the principal-signed rescind transaction occurs "off" the blockchain. The node 206 may broadcast the principal-signed rescind transaction 252 to the blockchain network at a later time if the node 206 wishes to withdraw the document associated with the node 206 from consideration by the principal node 204 or other nodes of the document repository system 100. Note that because the rescind transaction 252 includes the private key share ($\hat{p}_i$) of the node 206, if the rescind transaction 252 is broadcast to the blockchain network, the rescind transaction 252 may reveal the private key share of that node 206 on the blockchain, such that respective nodes may retrieve from the blockchain the set of private key shares for generating the collective private key (p) that may be used in combination with a nodal private key ($q_i$) for decrypting an encrypted document $Enc_L(Doc_i)$.

At 508, the node 206 may generate a reveal transaction 254 similar to that illustrated in FIG. 3C. For example, the reveal transaction 254 may be another example of a valid subsequent transaction described above. The reveal transaction 254 may include a transaction input having a hash of the document ($HoD_i$) associated with the node 206, a private key share ($\hat{p}_i$) of the node 206, a nodal private key ($q_i$) of the nodal private-public key pair associated with the node 206, and a signature of the node 206.

At 510, the principal node 204 may verify that the reveal transaction 254 includes the mandated transaction inputs and transaction outputs for the commitment channel 140. For example, the principal node 204 may verify that the reveal transaction 254 includes at least a signature of the node 206 or desired input output asset values. In some examples, the node 206 may not yet provide the hash of the document ($HoD_i$) associated with the node 206, the private key share ($\hat{p}_i$) of the node 206, or the nodal private key ($q_i$) of the nodal private-public key pair associated with the node 206. Once the principal node 204 verifies that the reveal transaction 254 includes the mandated transaction inputs and transaction outputs, the principal node 204 may append or concatenate a signature of the principal node ($\sigma(S)$) to the reveal transaction 254 and transmit the signed reveal transaction to the node 206. In some examples, the principal node 204 may append or concatenate a signature of the principal node without having knowledge of the hash of the document ($HoD_i$) associated with the node 206, the private key share ($\hat{p}_i$) of the node 206, or the nodal private key ($q_i$) of the nodal private-public key pair associated with the node 206. That is, at 510, the principal node 204 may be setting up the reveal transaction 254, such that the reveal transaction 254 may be subsequently broadcast to the blockchain network.

Note that exchange of the "unsigned" and the principal-signed reveal transaction occurs "off" the blockchain. The node 206 may broadcast the signed reveal transaction 254 to the blockchain network at a later time if the node 206 wishes to reveal the encrypted document at the data store 120 for consideration by the principal node 204 or other nodes participating in the document repository system 100. When the node 206 broadcasts the reveal transaction 254 to the blockchain network, the node 206 reveals the private key share ($\hat{p}_i$) of the node 206 on the blockchain and the nodal private key ($q_i$) for contributing to generation of the document crypto private key for decrypting the encrypted document of the node 206.

In some implementations, the node 206 may require that at least one valid subsequent transaction (e.g., at least one of the rescind transaction 252 or the reveal transaction 254) be signed by the principal node 204 prior to broadcasting the commitment transaction 250 to the blockchain network. By refraining from broadcasting the commitment transaction 250 of the node 206 to the blockchain network until at least one of a principal-signed rescind transaction 252 or a principal-signed reveal transaction 254 is received, the node 206 may be assured that a portion of the first asset value 390 (FIG. 3A) may be returned if at least one of the principal-signed rescind transaction 252 or the principal-signed reveal transaction 254 is broadcasted to the blockchain network prior to the first time-lock threshold (s1).

Because in the examples described herein, the at least one valid subsequent transaction may need to be principal-signed prior to encumbrances being removed on the third asset value 393 (FIG. 3B) or the fifth asset value 395 (FIG. 3C), the node 206 may refrain from broadcasting the commitment transaction 250 of that node 206 until the principal-signed valid subsequent transaction is received. Once a commitment transaction 250 is broadcast to the blockchain network, the node 206 may broadcast either the rescind transaction 252 or the reveal transaction 254 to the blockchain network for contributing the private key share ($\hat{p}_i$) of that node 206 to the set of respective private key shares in exchange for either said third asset value 393 or said fifth asset value 395. In some implementations, the rescind transaction 252 may be signed by the principal node 204 before the reveal transaction 254, or vice versa. In some examples, the node 206 may prefer that the reveal transaction 254 be signed by the principal node 204 before any other valid subsequent transaction, at least because said fifth asset value 395 may be greater than said third asset value 393. In some implementations, the rescind transaction 252 may be signed by the principal node 204 at substantially the same time as the reveal transaction 254.

When the node 206 submits neither the rescind transaction 252 nor the signed reveal transaction 254, as described herein, the principal node 204 may broadcast the timeout transaction 256 FIG. 3D to the blockchain network. The timeout transaction 256 may include a transaction output having an output for encumbering the first asset value 390 for the benefit of the principal node 204. In the circumstance that the node 206 may broadcast the commitment transaction 250 to the blockchain network for indicating that the node 206 may wish to submit a document to the document repository system 100, but in the circumstance that the node 206 fails to follow up with broadcasting either a signed rescind transaction 252 or a signed reveal transaction 254 before the first threshold time period (s1), the principal node 204 may remove the encumbrance on the first asset value 390. In this case, the first asset value 390 may be a penalty to the node 206 for failing to reveal the private key share ($\hat{p}_i$) of that node 206 on the blockchain.

In some implementations, either the node 206 or the principal node 204 may generate the timeout transaction 256. However, the principal node 204 may utilize the timeout transaction 256 for levying a penalty to the node 206 for failing to reveal the private key share on the blockchain. Thus, at operation 512, the principal node 204 may generate the timeout transaction 256. The timeout transaction 256 may be similar to that illustrated in FIG. 3D and may include a transaction input having a signature of the principal node 204.

At 514, the node 206 may verify that the timeout transaction 256 includes the mandated nLockTime-based transaction and, once verified, the node 206 may append or concatenate a signature of the node 206 ($\sigma(Ui)$) to the timeout transaction and transmit the signed timeout transaction to the principal node 204.

Further, the timeout transaction 256 may include a transaction output including an encumbrance on the first asset value 390 for the benefit of the principal node 204. Once the timeout transaction 256 is broadcast to the blockchain network, an encumbrance on the first asset value may be removed in response to a transaction input of a further transaction having the signature of the principal node ($\sigma(S)$). Note that the timeout transaction 256 is held in abeyance from being successfully broadcast and validated on the blockchain network until the first time-lock threshold (s1)

has passed. In some implementations, operations for forming the commitment channel 140 may prevent the node 206 from broadcasting the commitment transaction 250 to the blockchain network until the node 206 appends or concatenates the signature of the node ($\sigma(Ui)$) to timeout transaction 256.

In some implementations, once the timeout transaction 256 is successfully broadcast and validated on the blockchain network, the unencumbered first asset value 390 may be distributed to the other nodes as compensation or as a remedy for the lost opportunity to generate the collective private key based on a set of private key shares. Recall that each of the other nodes 206 depend on every other node 206 to reveal a respective private key share on the blockchain, such that the collective private key (p) may be generated for assembling a document crypto private key $l_i=p+q_i$. The document crypto private key may be utilized for unencrypting encrypted documents originating from respective nodes $U_i$.

In some implementations, the timeout transaction 256 that has been signed by both the node 206 and the principal node 204 may be stored in the data store 120, such that a plurality of nodes 106 (FIG. 1) to the document repository system 100 may take note that each of the nodes 106 in the plurality of nodes may be subject to a penalty if the respective node 206: (1) broadcasts a commitment transaction 250 to the blockchain network; and (2) fails to broadcast at least a rescind transaction 252 or a reveal transaction 254 that is signed by the principal node 204 prior to the first time-lock threshold (s1).

At 516, the node 206 may broadcast the commitment transaction 250 associated with that node 206 to the blockchain network. The commitment channel 140 can be formed when the commitment transaction 250 is broadcast to the blockchain network. Based at least on the above examples, said node 206 and the principal node 204 may conduct operations 502 to 516, described herein, for forming the commitment channel 140.

Further, to ensure that the node 206 is not penalized with a value equivalent to the first asset value 390 (FIG. 3A), at 518, the node 206 may broadcast to the blockchain network either a rescind transaction 252 or a reveal transaction 254 prior to the first time-lock threshold (s1).

Figure 6:
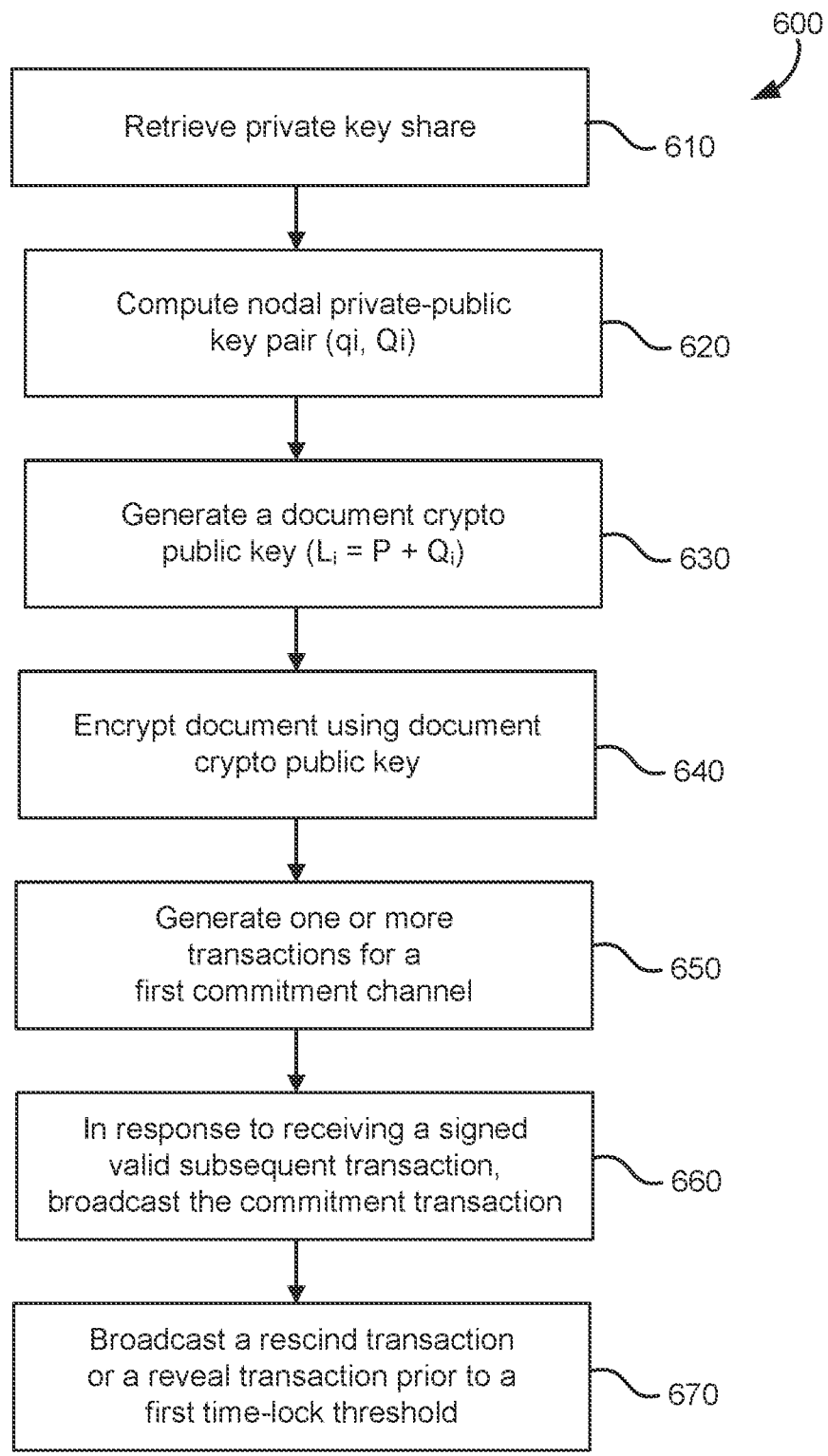
FIG. 6 illustrates, in flowchart form, a method implemented at a node of submitting a document to the document repository system, in accordance with an example of the present application.

Reference is now made to FIG. 6, which illustrates, in flowchart form, a method 600 implemented at a node 106 (e.g., a first node=node i) of FIG. 1 for submitting a document to the document repository system 100 (FIG. 1), in accordance with an example of the present application. The method 600 may include operations that may be carried out by one or more processors of the node 106 of the blockchain network. The method 600 may be carried out by the node 106 for submitting a document to the document repository system 100 for consideration by the principal node 104 (FIG. 1) or by any other node participating in the document repository system 100.

At operation 610, the processor may retrieve a private key share ($p^{\hat{}}_i$) based on operations of a threshold secret sharing protocol for distributing or assigning private key shares to respective nodes in the document repository system 100. Examples of the threshold secret sharing protocol include the Shamir method, described above; however, other methods similar to the threshold secret sharing protocol can be contemplated. As described, a collective private key (p) of a collective private-public key pair (p, P) may be used for generating a document crypto private key ($l_i=p+q_i$) for decrypting an encrypted document $Enc_L(Doc_i)$ stored at an accessible data store 120 (FIG. 1).

At operation 620, the processor may compute a nodal private-public key pair ($q_i$, $Q_i$). The computed nodal private-public key pair may be used as a "one-time code". For example, the nodal public key ($Q_i$) of the nodal private-public key pair may be used for generating a document crypto public key ($L_i=P+Q_i$). The nodal private key ($q_i$) may be broadcast via a reveal transaction 254 (FIG. 2). Thus, once the nodal private key is made public to the blockchain network, the node 106 may refrain from using said nodal private-public key pair for future encryption operations within the document repository system 100.

At operation 630, the processor may generate the document crypto public key ($L_i=P+Q_i$). In some examples, the processor may generate the document crypto public key by combining a collective public key (retrieved via operations of a threshold secret sharing protocol) and a nodal public key of the node 106.

At operation 640, the processor may encrypt the document that the node 106 is tasked with submitting to the document repository system 100. The encrypted document may be stored at the data store 120. Any of the nodes in the document repository system 100 may access the data store 120 for retrieving encrypted documents stored therein. However, a node may not discern contents of any one of the encrypted documents until the document of interest is decrypted with a document crypto private key. The document crypto private key includes a combination of the collective private key and a nodal private key associated with the document of interest. The node 106 may generate the collective private key (p) once a threshold number of nodes participating in the document repository system 100 reveal a respective private key share on the blockchain via a rescind transaction 252 or a reveal transaction 254. In some examples, the encrypted document may not be recorded via transactions broadcasted to the blockchain network. Rather, a hash of the document or the encrypted document may be recorded on one or more transactions described herein that may be broadcast to the blockchain network.

At operation 650, the processor may generate one or more transactions for a first commitment channel 140 (FIG. 1). In an example implementation, the processor may generate the one or more transactions for the first commitment channel 140 for the node 106 based on the operations described by the sequence diagram 500 in FIG. 5. The first commitment channel 140 can be determined to be formed in a subsequent operation when a commitment transaction 250 (FIG. 2) has been generated, when at least one of a rescind transaction 252 or a reveal transaction 254 has been signed by the principal node 204 (FIG. 2), and when that commitment transaction 250 has been broadcast to the blockchain network. In some example implementations, a commitment channel 140 may be formed when each of the described transactions by FIG. 5 have been generated and signed by the node 106 and by the principal node 104 and when the commitment transaction 250 is broadcast to the blockchain network.

At operation 660, in response to receiving a valid rescind transaction or a reveal transaction signed by the principal node, the processor may broadcast the commitment transaction 250 to the blockchain network, such that the commitment transaction 250 may be validated by mining nodes of the blockchain network. In some examples, once the processor broadcasts the commitment transaction 250 to the blockchain network, the processor forms the commitment channel 140. In some implementations, broadcasting the commitment transaction 250 to the blockchain network may be akin to submitting the document of the node 106 to the document repository system 100 for consideration by the principal node or the other nodes participating in the document repository system 100.

The processor may refrain from broadcasting the commitment transaction 250 to the blockchain network until such time that a valid rescind transaction or a reveal transaction is signed by the principal node 104. As described herein, a rescind transaction or a reveal transaction may include transaction outputs for removing a encumbrance on at least a portion of a first asset value 390 (FIG. 3B, 3C), such that a portion of the first asset value 390 may be returned to the node 106 as an UTXO in exchange for contribution of at least the private key share of the node 106 to the set of private key shares.

In some examples, if the processor does not receive a valid rescind transaction or a reveal transaction signed by the principal node, the processor may halt formation of the commitment channel and the processor may avoid broadcasting a commitment transaction to the blockchain network.

Once an indication has been made by the node 106, via broadcast of the commitment transaction, that the processor may be submitting a document for consideration in the document repository system 100, at operation 670, the processor may broadcast a rescind transaction or a reveal transaction to the blockchain network prior to a first time-lock threshold (s1). The first time-lock threshold (s1) may be established by the principal node or any other node of the document repository system 100. The first time-lock threshold may be setup to govern a period of time for document submission and private key share submission by respective nodes to the document repository system 100.

The processor may broadcast the reveal transaction to the blockchain network if that node intends to have that document considered. The document may be considered by the principal node or any other nodes of the system for selection. For example, the document may be a submission to a contest that is managed by the document management system 100. In some other examples, the document may be a legal document submission to a court that is managed by the document management system 100, where legal document submission deadlines may be prescribed by statute. In other examples, the document may be a tender submission to a government agency for award of an infrastructure project and that is managed by the document management system 100. By limiting revelation of document contents to when a temporal time threshold has been passed, a tendering process may promote tender submissions that may yield a competitive process (e.g., best cost, etc.).

In some examples, the processor may broadcast the rescind transaction to the blockchain network if that node intends to have that document removed from consideration, but intends to reveal the private key share of that node such that a requisite set of private key shares may be collected for generating a collective private key (p) for document decryption. Note that a node may be incentivized to broadcast the rescind transaction to the blockchain network, rather than simply not broadcast any valid subsequent transaction, at least because broadcasting the rescind transaction: (1) reveals the private key share of that node on the blockchain; and (2) encumbers a portion of the first asset value for the benefit of that node. If that node were to simply not broadcast any valid subsequent transaction, the first asset value would be encumbered (via a timeout transaction broadcast by the principal node) for the benefit of the principal node or for the benefit for each of the other nodes participating in the document repository system 100.

Figure 7:
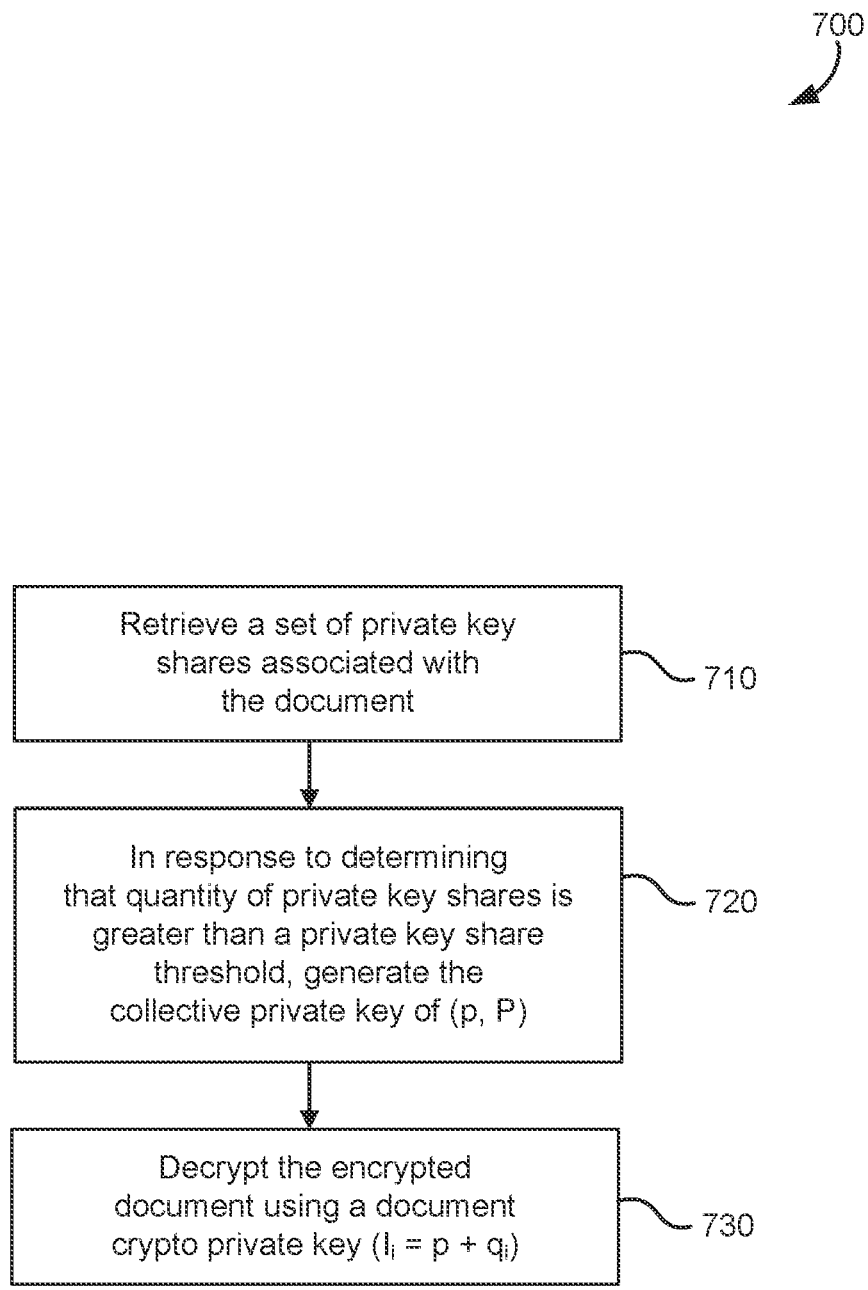
FIG. 7 illustrates, in flowchart from, a method implemented at a node of verifying a document submitted to the document repository system.

Reference is now made to FIG. 7, which illustrates, in flowchart form, a method 700 implemented at a node 106 (e.g., a first node=node i) of FIG. 1 of verifying a document submitted to the document repository system 100 (FIG. 1), in accordance with an example of the present application. The method 700 may include operations that may be carried out by one or more processors of the node 106 of the blockchain network. The method 700 may be carried out by the node 106 for verifying previously submitted documents to the document repository system 100.

At operation 710, the processor may retrieve from the blockchain a set of private key shares associated with a document ($Doc_i$) or an encrypted document $Enc_L(Doc_i)$. The set of private key shares may include private key shares (e.g., ($\hat{p}_1$, $\hat{p}_2$, ..., $\hat{p}_{n-1}$, $\hat{p}_n$)), where each private key share in the set may be retrieved based on reveal transactions or rescind transactions broadcasted on the blockchain network by respective nodes that are participating in verifying that respective document ($Doc_i$).

At operation 720, in response to determining that the quantity of private key shares is greater than a private key share threshold, the processor may generate the collective private key (p) of the collective private-public key pair (p, P) from the retrieved set of private key shares (e.g., ($\hat{p}_1$, $\hat{p}_2$, ..., $\hat{p}_{n-1}$, $\hat{p}_n$)). In some examples, where n nodes may be participating in verifying the document submitted to the document repository system 100, the private key share threshold may be n private key shares. That is, to enable any of the nodes 106 or the principal node 104 to verify a document in the data store 120 (FIG. 1), each of the n participating nodes must reveal their respective private key share $\hat{p}_n$ on the blockchain. If one or more of the n nodes fails to reveal their respective private key share (e.g., via broadcasting a rescind transaction or a reveal transaction), the processor may be unable to generate the collective private key (p) for generating a document crypto private key ($l_i=p+q_i$). If one or more of the n nodes fails to reveal their respective private key, none of the nodes 106 participating in the document repository system 100 may be able to unencrypt the encrypted document stored at the data store 120. That is, without the collaboration/contribution of private key shares from each of the n nodes, none of the nodes may decrypt and verify encrypted documents.

In some examples, where n nodes may be participating in verifying the document submitted to the document repository system 100, the private key share threshold may be less than the number of nodes participating in the document repository system 100. Thus, if one or more of the n nodes fails to reveal their respective private key, but if the quantity of private key shares is greater than the private key share threshold, the processor may be able to generate the collective private key (p) for generating the document crypto private key ($l_i=p+q_i$). In some implementations, it may be desirable to provide the private key share threshold as less than the number of nodes participating in the document repository system 100 to account for nodes that may lose a connection to the blockchain network or to account for a limited number of nodes that may fail to broadcast a reveal transaction or a rescind transaction prior a first time-lock threshold (s1).

In some examples, if the processor fails to retrieve from the blockchain a requisite quantity of private key shares that is greater than the private key share threshold prior to the first time-lock threshold (s1), the processor may be unable to unencrypt the encrypted document stored at the data store 120 at least because the collective private key may not be generated. In such a circumstance, in some implementations, the principal node 104 (FIG. 1) may broadcast the timeout transaction 256 (FIG. 2) to the blockchain network and an encumbrance on the first asset value 390 (FIG. 3D) may be removed and, subsequently, included in a locking script in favour of the principal node 104 or other nodes in the document repository system 100.

If the processor is able to generate the collective private key from the retrieved set of private key shares, at operation 730, the processor may decrypt the encrypted document ($Enc_L(Doc_i)$) by: (1) generating the document crypto private key ($l_i=p+q_i$); and (2) unencrypting the encrypted document using the document crypto private key.

In some implementations, the processor may conduct operations for hashing (e.g., $H(\theta)$) the unencrypted document and verifying the hash of the document ($H(Doc_i)$) with a hash of the document retrieved from the broadcasted commitment transaction associated with the node that originated the document. Note that once the requisite quantity of private key shares have been revealed on the blockchain, any of the nodes 106 in the document repository system 100 may unencrypt encrypted documents ($Enc_L(Doc_i)$) based on the combination of: (1) generated collective private key from the set of private key shares; and (2) a nodal private key ($q_i$) provided by the respective $node_i$ associated with the document ($Doc_i$). In some implementations, each node participating in the document repository system 100 may perform operations for: (1) decrypting the encrypted document; (2) hashing the decrypted document; and (3) verifying that a hash of the decrypted document corresponds to a hash of the document retrieved from a broadcasted commitment transaction associated with the node that originated that document.

Figure 8:
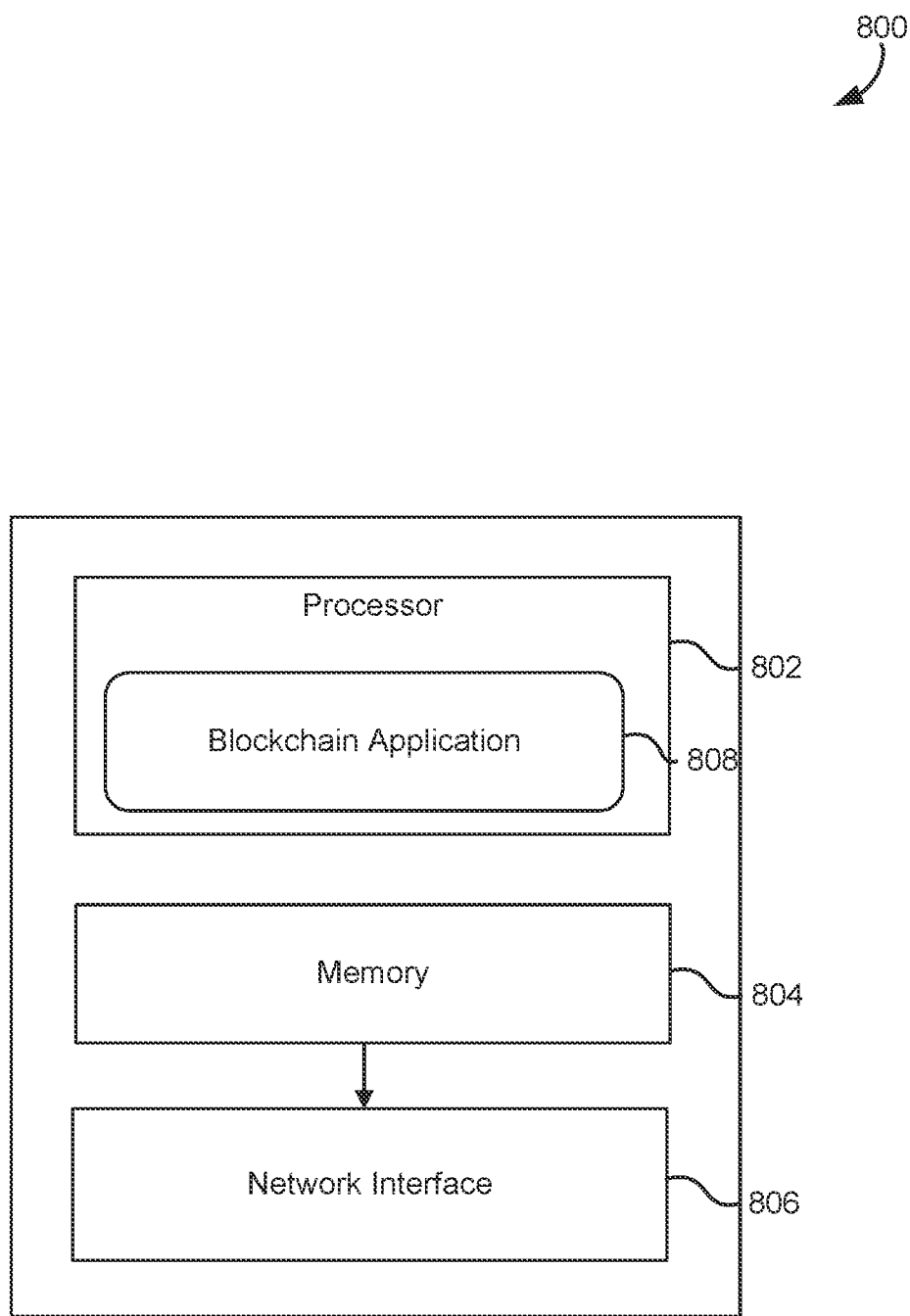
FIG. 8 illustrates, in block diagram form, a simplified node.

Reference is now made to FIG. 8, which illustrates, in block diagram form, a simplified node 800, in accordance with an example of the present application. The node 800 includes a processor 802, which may include one or more microprocessors, application specific integrated circuits (ASICs), microcontrollers, or similar computer processing devices. The node 800 may further include memory 804, which may include persistent and non-persistent memory, to store values, variables, and in some instances processor-executable program instructions, and a network interface 806.

The node 800 may include a processor-executable blockchain application 808 containing processor-executable instructions that, when executed, cause the processor 802 to carry out one or more of the functions or operations described herein.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of verifying a digital resource by a plurality of nodes and a principal node in a blockchain network, wherein:
    a collective private key of a collective private-public key pair is based on a set of private key shares,
    the principal node has at least two private key shares of said set of private key shares,
    each of the plurality of nodes has one private key share of said set of private key shares, and
    a first node of said plurality of nodes has a first nodal private-public key pair,
    the method comprising:
    generating, by the first node, a digital resource crypto public key by combining a first nodal public key of the first nodal private-public key pair and a collective public key of the collective private-public key pair;
    encrypting the digital resource using the digital resource crypto public key;
    generating one or more blockchain transactions for a first commitment channel by:
        generating, by the first node, a commitment transaction having a commitment transaction output which requires that a valid subsequent transaction having the commitment transaction output as an input is to include the private key share of the first node, and
        receiving, by the first node, the valid subsequent transaction signed by the principal node;
    broadcasting the commitment transaction to the blockchain network;
    retrieving, from a blockchain of the blockchain network, a subset of said set of private key shares;
    in response to determining that a quantity of said subset of private key shares is greater than a private key share threshold, regenerating the collective private key of the collective private-public key pair from the subset of private key shares and the private key share of the principal node; and
    decrypting the encrypted digital resource using a digital resource crypto private key, the digital resource crypto private key being a combination of the regenerated collective private key and a first nodal private key of the first nodal private-public key pair.

2. The method of claim 1, further comprising:
    broadcasting, by the first node, to the blockchain network the valid subsequent transaction that is signed by the principal node prior to a first time-lock threshold to reveal the private key share of the first node on the blockchain network.

3. The method of claim 1, wherein the commitment transaction has a transaction output that includes more than one unlocking options including a reveal option that requires a hash of the digital resource, the private key share of the first node, a first nodal private key of the first nodal private-public key pair, a signature of the principal node, and a signature of the first node, such that a valid subsequent transaction includes a transaction input with said hash of the digital resource, said private key share of the first node, said first nodal private key of the first nodal private-public key pair, said signature of the principal node, and said signature of the first node for selecting the reveal option.

4. The method of claim 1, wherein the commitment transaction has a transaction output that includes more than one unlocking options including a rescind option that requires the private key share of the first node, a signature of the principal node, and a signature of the first node, such that a valid subsequent transaction includes a transaction input with said private key share of first node, said signature of the principal node, and said signature of the first node for selecting the rescind option.

5. The method of claim 1, wherein the commitment transaction has a transaction output that includes more than one unlocking options including a timeout option that requires a signature of the principal node and a signature of the first node, such that a valid subsequent transaction includes a transaction input with said signature of the principal node and said signature of the first node for selecting the timeout option.

6. The method of claim 1, wherein the encrypted digital resource is stored in a public repository, and wherein the commitment transaction broadcasts to the blockchain network that a document generated by the first node is saved at the public repository.

7. The method of claim 1, wherein an encumbrance on a first asset value is removed in response to the input of the valid subsequent transaction having at least a signature of the principal node and a signature of the first node.

8. The method of claim 1, wherein the valid subsequent transaction is a rescind transaction signed by the principal node, wherein prior to receiving the rescind transaction signed by the principal node, and wherein the method further comprises:
  generating the rescind transaction including a transaction input having the private key share of the first node and a signature of the first node.

9. The method of claim 8, wherein:
  an encumbrance on a first asset value is removed in response to the transaction input of the rescind transaction having the private key share of the first node, a signature of the principal node, and the signature of the first node;
  an encumbrance on a second asset value is removed in response to a transaction input of a further transaction having the signature of the principal node;
  an encumbrance on a third asset value is removed in response to a transaction input of a further transaction having the signature of the first node; and
  the third asset value is a difference between the first asset value and the second asset value.

10. The method of claim 1, wherein the valid subsequent transaction is a reveal transaction signed by the principal node, and wherein prior to receiving the reveal transaction signed by the principal node, the method further comprises:
  generating the reveal transaction to include a transaction input having a hash of the digital resource, the private key share of the first node, a first nodal private key of the first nodal private-public key pair, and a signature of the first node.

11. The method of claim 10, wherein:
  an encumbrance on a first asset value is removed in response to the transaction input of the reveal transaction having the hash of the digital resource, the private key share of the first node, the first nodal private key of the first nodal private-public key pair, a signature of the principal node, and the signature of the first node;
  an encumbrance on a fourth asset value is removed in response to a transaction input of a further transaction having the signature of the principal nodes;
  an encumbrance on a fifth asset value is removed in response to a transaction input of a further transaction having the signature of the first node; and
  the fifth asset value is a difference between the first asset value and the fourth asset value.

12. The method claim 1, wherein generating the one or more blockchain transactions for the first commitment channel further comprises generating a timeout transaction, and wherein the timeout transaction is eligible to be broadcast by the principal node to the blockchain network after a first time-lock threshold has passed.

13. A computing device to participate in verifying a digital resource, the computing device being a first node of a plurality of nodes in a blockchain network, wherein:
  a collective private key of a collective private-public key pair is based on a set of private key shares,
  a principal node in the blockchain network has at least two of said private key shares,
  each of the plurality of nodes has one of said private key shares, and
  said first node has a first nodal private-public key pair;
  the computing device comprising:
  a processor;
  a memory;
  a network interface to provide network connectivity to the other nodes in the plurality of nodes; and
  a blockchain application containing computer-executable instructions that, when executed by the processor, cause the processor to carry out steps of:
    generating, by the first node, a digital resource crypto public key by combining a first nodal public key of the first nodal private-public key pair and a collective public key of the collective private-public key pair;
    encrypting the digital resource using the digital resource crypto public key;
    generating one or more blockchain transactions for a first commitment channel by:
      generating, by the first node, a commitment transaction having a commitment transaction output which requires that a valid subsequent transaction having the commitment transaction output as an input is to include the private key share of the first node, and
      receiving, by the first node, the valid subsequent transaction signed by the principal node; and
    broadcasting the commitment transaction to the blockchain network.

14. A computing device according to claim 13, wherein the computer-executable instructions cause the processor to carry out the further step of broadcasting to the blockchain network the valid subsequent transaction that is signed by the principal node prior to a first time-lock threshold to reveal the private key share of the first node on the blockchain network.

15. A computing device according to claim 13, wherein the computer-executable instructions cause the processor to carry out the further steps of:
  retrieving, from a blockchain of the blockchain network, a subset of said private key shares;
  in response to determining that a quantity of said subset of private key shares is greater than a private key share threshold, regenerating the collective private key of the collective private-public key pair from the subset of private key shares and the private key share of the principal node; and
  decrypting the encrypted digital resource using a digital resource crypto private key, the digital resource crypto private key being a combination of the regenerated collective private key and a first nodal private key of the first nodal private-public key pair.

16. A computing device according to claim 13, wherein the commitment transaction has a transaction output that includes more than one unlocking options including a reveal option that requires a hash of the digital resource, the private key share of the first node, a first nodal private key of the first nodal private-public key pair, a signature of the principal node, and a signature of the first node, such that a valid subsequent transaction includes a transaction input with said hash of the digital resource, said private key share of the first node, said first nodal private key of the first nodal private-public key pair, said signature of the principal node, and said signature of the first node for selecting the reveal option.

17. A non-transitory processor-readable medium storing processor-executable instructions to verify a digital resource by a plurality of nodes in a blockchain network, wherein:
   a collective private key of a collective private-public key pair is based on a set of private key shares,
   a principal node in the blockchain network has at least two of said private key shares,
   each of the plurality of nodes has one of said private key shares, and
   a first node has a first nodal private-public key pair;
   the processor-executable instructions, when executed by a processor in a first node of the set of nodes, cause the processor to carry out steps of:
      generating a digital resource crypto public key by combining a first nodal public key of a first nodal private-public key pair held by said first node, and a collective public key of the collective private-public key pair;
      encrypting the digital resource using the digital resource crypto public key;
      generating one or more blockchain transactions for a first commitment channel by:
         generating a commitment transaction having a commitment transaction output which requires that a valid subsequent transaction having the commitment transaction output as an input is to include the private key share of the first node, and
         receiving the valid subsequent transaction signed by the principal node; and
      broadcasting the commitment transaction to the blockchain network.

18. A non-transitory processor-readable medium according to claim 17, wherein the processor-executable instructions cause the processor to carry out the further step of broadcasting to the blockchain network the valid subsequent transaction that is signed by the principal node prior to a first time-lock threshold to reveal the private key share of the first node on the blockchain network.

19. A non-transitory processor-readable medium according to claim 17, wherein the processor-executable instructions cause the processor to carry out the further steps of:
   retrieving from the blockchain a plurality of said private key shares;
   in response to determining that a quantity of a subset of private key shares is greater than a private key share threshold, regenerating the collective private key of the collective private-public key pair from said subset of private key shares and the private key share of the principal node; and
   decrypting the encrypted digital resource using a digital resource crypto private key, the digital resource crypto private key being a combination of the regenerated collective private key and a first nodal private key of the first nodal private-public key pair.

* * * * *